United States Patent
Gonzales, Jr. et al.

(10) Patent No.: US 11,367,071 B2
(45) Date of Patent: Jun. 21, 2022

(54) SECURE TRACKING AND TRANSFER OF ITEMS USING A BLOCKCHAIN

(71) Applicant: eBay, Inc., San Jose, CA (US)

(72) Inventors: Sergio Pinzon Gonzales, Jr., San Jose, CA (US); Todd Loren Lash, Oakland, CA (US); Ethan Benjamin Rubinson, Santa Clara, CA (US); Seyed-Mahdi Pedramrazi, San Jose, CA (US); Fausto Dassenno, London (GB)

(73) Assignee: eBay, Inc., San Jose, CA (US)

( * ) Notice: Subject to any disclaimer, the term of this patent is extended or adjusted under 35 U.S.C. 154(b) by 144 days.

(21) Appl. No.: 16/041,671

(22) Filed: Jul. 20, 2018

(65) Prior Publication Data
US 2019/0205894 A1    Jul. 4, 2019

Related U.S. Application Data

(60) Provisional application No. 62/612,091, filed on Dec. 29, 2017.

(51) Int. Cl.
*G06Q 20/38* (2012.01)
*H04L 9/32* (2006.01)
(Continued)

(52) U.S. Cl.
CPC .......... *G06Q 20/389* (2013.01); *G06F 21/10* (2013.01); *G06F 21/30* (2013.01); *G06F 21/602* (2013.01);
(Continued)

(58) Field of Classification Search
None
See application file for complete search history.

(56) References Cited

U.S. PATENT DOCUMENTS

| 5,557,088 A | 9/1996 | Shimizu et al. |
| 5,607,350 A | 3/1997 | Levasseur et al. |

(Continued)

FOREIGN PATENT DOCUMENTS

| CN | 106130738 A | 11/2016 |
| CN | 106777923 A | 5/2017 |

(Continued)

OTHER PUBLICATIONS

Corrected Notice Of Allowability received for U.S. Appl. No. 15/858,949, dated Jun. 10, 2020, 2 pages.

(Continued)

*Primary Examiner* — Jacob C. Coppola
(74) *Attorney, Agent, or Firm* — Shook, Hardy & Bacon LLP

(57) ABSTRACT

Technologies are shown for tracking transfer of an item on an item tracking data blockchain, where transfers of the item and the holder of the item are recorded in item tracking data blocks of the blockchain. In some examples, a verification of the item is performed for a transfer and recorded in the data block for the transfer. In other examples, the blockchain stores a unique code for the ticket. Transfers of the ticket are recorded in the blockchain. When the ticket is presented for use, a holder identifier and a presented ticket code are validated against a holder identifier in the most recent block in the blockchain and the unique code for the ticket stored in the blockchain. In some examples, a portion of a resale price of the ticket is sent to an issuer of the ticket.

12 Claims, 22 Drawing Sheets

(51) Int. Cl.

| | | |
|---|---|---|
| *G06F 21/62* | (2013.01) | |
| *G06F 21/10* | (2013.01) | |
| *G06Q 20/08* | (2012.01) | |
| *G06Q 40/08* | (2012.01) | |
| *G06F 21/30* | (2013.01) | |
| *H04L 9/06* | (2006.01) | |
| *G06Q 20/42* | (2012.01) | |
| *G06Q 30/00* | (2012.01) | |
| *G06F 21/60* | (2013.01) | |
| *G06Q 20/40* | (2012.01) | |
| *H04L 9/30* | (2006.01) | |
| *H04L 9/40* | (2022.01) | |
| *H04L 65/612* | (2022.01) | |
| *H04L 67/53* | (2022.01) | |
| *H04L 67/63* | (2022.01) | |
| *G06F 21/64* | (2013.01) | |
| *G06F 16/27* | (2019.01) | |
| *G06F 16/18* | (2019.01) | |
| *H04L 67/52* | (2022.01) | |

(52) U.S. Cl.
CPC .......... *G06F 21/62* (2013.01); *G06F 21/6218* (2013.01); *G06F 21/6245* (2013.01); *G06Q 20/0855* (2013.01); *G06Q 20/3825* (2013.01); *G06Q 20/3829* (2013.01); *G06Q 20/401* (2013.01); *G06Q 20/42* (2013.01); *G06Q 30/018* (2013.01); *G06Q 40/08* (2013.01); *H04L 9/0637* (2013.01); *H04L 9/0643* (2013.01); *H04L 9/30* (2013.01); *H04L 9/3236* (2013.01); *H04L 9/3239* (2013.01); *H04L 9/3247* (2013.01); *H04L 9/3297* (2013.01); *H04L 63/102* (2013.01); *H04L 63/12* (2013.01); *H04L 65/4084* (2013.01); *H04L 67/20* (2013.01); *H04L 67/327* (2013.01); *G06F 16/1805* (2019.01); *G06F 16/27* (2019.01); *G06F 21/645* (2013.01); *G06F 2221/2107* (2013.01); *H04L 67/18* (2013.01); *H04L 2209/38* (2013.01); *H04L 2209/56* (2013.01)

(56) References Cited

U.S. PATENT DOCUMENTS

| | | | |
|---|---|---|---|
| 7,627,531 | B2 | 12/2009 | Breck et al. |
| 7,656,271 | B2 | 2/2010 | Ehrman et al. |
| 9,635,000 | B1 | 4/2017 | Muftic |
| 9,641,342 | B2 | 5/2017 | Sriram et al. |
| 9,680,799 | B2 | 6/2017 | Iyer et al. |
| 9,722,790 | B2 | 8/2017 | Ebrahimi |
| 9,749,140 | B2 | 8/2017 | Oberhauser et al. |
| 9,749,297 | B2 | 8/2017 | Gvili |
| 9,774,578 | B1 | 9/2017 | Ateniese et al. |
| 9,794,074 | B2 | 10/2017 | Toll et al. |
| 10,523,443 | B1* | 12/2019 | Kleinman ............ H04L 63/0853 |
| 10,657,595 | B2* | 5/2020 | de Jong ................ G06Q 40/04 |
| 10,715,323 | B2 | 7/2020 | Chan et al. |
| 2004/0024688 | A1 | 2/2004 | Bi et al. |
| 2006/0100965 | A1 | 5/2006 | Simelius |
| 2013/0174272 | A1 | 7/2013 | Chevalier et al. |
| 2013/0219458 | A1 | 8/2013 | Ramanathan |
| 2015/0302400 | A1 | 10/2015 | Metral |
| 2015/0332283 | A1 | 11/2015 | Witchey |
| 2016/0028552 | A1 | 1/2016 | Spanos et al. |
| 2016/0191243 | A1 | 6/2016 | Manning |
| 2016/0203572 | A1 | 7/2016 | Mcconaghy et al. |
| 2016/0284033 | A1 | 9/2016 | Winand et al. |
| 2016/0300234 | A1 | 10/2016 | Moss-pultz et al. |
| 2016/0321752 | A1 | 11/2016 | Tabacco et al. |
| 2016/0330034 | A1 | 11/2016 | Back et al. |
| 2016/0335533 | A1 | 11/2016 | Davis et al. |
| 2016/0342976 | A1 | 11/2016 | Davis |
| 2016/0342977 | A1 | 11/2016 | Lam |
| 2016/0358184 | A1 | 12/2016 | Radocchia et al. |
| 2016/0379212 | A1 | 12/2016 | Bowman et al. |
| 2017/0005804 | A1 | 1/2017 | Zinder |
| 2017/0011460 | A1 | 1/2017 | Molinari et al. |
| 2017/0046526 | A1 | 2/2017 | Chan et al. |
| 2017/0046651 | A1 | 2/2017 | Lin et al. |
| 2017/0046664 | A1 | 2/2017 | Haldenby et al. |
| 2017/0046806 | A1* | 2/2017 | Haldenby ............ G06F 21/645 |
| 2017/0048209 | A1 | 2/2017 | Lohe et al. |
| 2017/0103385 | A1 | 4/2017 | Wilson et al. |
| 2017/0103390 | A1 | 4/2017 | Wilson et al. |
| 2017/0109735 | A1 | 4/2017 | Sheng et al. |
| 2017/0116693 | A1 | 4/2017 | Rae et al. |
| 2017/0132630 | A1 | 5/2017 | Castinado et al. |
| 2017/0149560 | A1 | 5/2017 | Shah |
| 2017/0177898 | A1 | 6/2017 | Dillenberger |
| 2017/0213210 | A1* | 7/2017 | Kravitz .................. G06Q 30/06 |
| 2017/0232300 | A1 | 8/2017 | Tran et al. |
| 2017/0236102 | A1 | 8/2017 | Biton |
| 2017/0236103 | A1 | 8/2017 | Biton |
| 2017/0236104 | A1 | 8/2017 | Biton |
| 2017/0237570 | A1 | 8/2017 | Vandervort |
| 2017/0243193 | A1 | 8/2017 | Manian et al. |
| 2017/0250796 | A1 | 8/2017 | Samid |
| 2017/0300627 | A1 | 10/2017 | Giordano et al. |
| 2017/0300928 | A1 | 10/2017 | Radocchia et al. |
| 2017/0302663 | A1 | 10/2017 | Nainar et al. |
| 2017/0308872 | A1 | 10/2017 | Uhr et al. |
| 2017/0317997 | A1 | 11/2017 | Smith et al. |
| 2017/0329980 | A1 | 11/2017 | Hu et al. |
| 2017/0331810 | A1 | 11/2017 | Kurian |
| 2017/0337534 | A1 | 11/2017 | Goeringer et al. |
| 2017/0366353 | A1 | 12/2017 | Struttmann |
| 2018/0018723 | A1 | 1/2018 | Nagla et al. |
| 2018/0025442 | A1 | 1/2018 | Isaacson et al. |
| 2018/0108089 | A1* | 4/2018 | Jayachandran .... G06Q 30/0282 |
| 2018/0130050 | A1* | 5/2018 | Taylor .................. H04L 9/3247 |
| 2018/0158054 | A1* | 6/2018 | Ardashev ............ G06Q 20/389 |
| 2018/0167198 | A1* | 6/2018 | Muller .................. G06F 21/44 |
| 2018/0173719 | A1 | 6/2018 | Bastide et al. |
| 2018/0189528 | A1* | 7/2018 | Hanis .................. G06Q 10/087 |
| 2018/0257306 | A1 | 9/2018 | Mattingly et al. |
| 2018/0294957 | A1 | 10/2018 | O'brien et al. |
| 2018/0330348 | A1 | 11/2018 | Uhr et al. |
| 2018/0330349 | A1 | 11/2018 | Uhr et al. |
| 2018/0349621 | A1 | 12/2018 | Schvey et al. |
| 2018/0349893 | A1 | 12/2018 | Tsai |
| 2019/0013932 | A1* | 1/2019 | Maino .................. G06F 9/542 |
| 2019/0102409 | A1 | 4/2019 | Shi et al. |
| 2019/0109713 | A1 | 4/2019 | Clark et al. |
| 2019/0132138 | A1* | 5/2019 | Finlow-Bates ....... H04L 9/3236 |
| 2019/0205558 | A1 | 7/2019 | Gonzales, Jr. |
| 2019/0205563 | A1 | 7/2019 | Gonzales, Jr. |
| 2019/0205826 | A1* | 7/2019 | Hanis .................. G06Q 10/087 |
| 2019/0205870 | A1 | 7/2019 | Kamalsky et al. |
| 2019/0205873 | A1 | 7/2019 | Kamalsky et al. |
| 2019/0207759 | A1 | 7/2019 | Chan et al. |
| 2019/0207995 | A1 | 7/2019 | Gonzales, Jr. |
| 2019/0318351 | A1* | 10/2019 | Ardashev ............ G06Q 20/389 |
| 2020/0012763 | A1 | 1/2020 | Arngren et al. |
| 2020/0119905 | A1 | 4/2020 | Revankar et al. |
| 2020/0195436 | A1 | 6/2020 | Khan |
| 2020/0211005 | A1* | 7/2020 | Bodorik .................. G06Q 10/00 |

FOREIGN PATENT DOCUMENTS

| | | |
|---|---|---|
| CN | 106920169 A | 7/2017 |
| CN | 107070644 A | 8/2017 |
| CN | 107077682 A | 8/2017 |
| CN | 107086909 A | 8/2017 |
| CN | 107273759 A | 10/2017 |
| KR | 10-1781583 B1 | 9/2017 |
| WO | 2016/128567 A1 | 8/2016 |
| WO | 2017/004527 A1 | 1/2017 |
| WO | 2017/006136 A1 | 1/2017 |
| WO | 2017/027900 A1 | 2/2017 |

(56) References Cited

FOREIGN PATENT DOCUMENTS

| WO | 2017/066002 A1 | 4/2017 |
|---|---|---|
| WO | 2017/090041 A1 | 6/2017 |
| WO | 2017/098519 A1 | 6/2017 |
| WO | 2017/145003 A1 | 8/2017 |
| WO | 2017/145017 A1 | 8/2017 |
| WO | 2017/145047 A1 | 8/2017 |
| WO | 2017/148245 A1 | 9/2017 |
| WO | 2017/153495 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133307 A1 | 7/2019 |
| WO | 2019/133308 A1 | 7/2019 |
| WO | 2019/133309 A1 | 7/2019 |
| WO | 2019/133310 A1 | 7/2019 |

OTHER PUBLICATIONS

Notice Of Allowance received for U.S. Appl. No. 16/020,969, dated May 18, 2020, 16 pages.
Applicant Initiated Interview Summary Received for U.S. Appl. No. 16/020,975, dated Jun. 2, 2020, 2 pages.
Response to Non-Final Office Action filed on May 22, 2020 for U.S. Appl. No. 16/020,975, dated Feb. 28, 2020, 15 Pages.
Applicant Initiated Interview Summary Received for U.S. Appl. No. 16/041,680, dated May 1, 2020, 3 Pages.
Corrected Notice Of Allowability received for U.S. Appl. No. 16/041,680, dated Jul. 8, 2020, 2 pages.
Notice Of Allowance received for U.S. Appl. No. 16/041,680, dated Jun. 10, 2020, 8 pages.
Response to Non-Final Office Action filed on May 18, 2020 for U.S. Appl. No. 16/041,680, dated Feb. 26, 2020, 16 pages.
Applicant Initiated Interview Summary Received for U.S. Appl. No. 16/181,814, dated May 5, 2020, 3 Pages.
Notice of Allowance received for U.S. Appl. No. 16/181,814, dated Jul. 20, 2020, 15 Pages.
Response to Non-Final Office Action Filed on May 14, 2020 for U.S. Appl. No. 16/181,814, dated Feb. 20, 2020, 20 Pages.
Supplemental Amendment Filed on Jul. 10, 2020 for U.S. Appl. No. 16/181,814, dated Feb. 20, 2020, 12 pages.
Bhargavan et al., "Short Paper: Formal Verification of Smart Contracts", retrieved From Internet URL<http://research.microsoft.com/en-us/um/people/nswamy/papers/solidether.pdf>, Aug. 27, 2016, pp. 1-6.
Huckle et al., "Internet ofThings, Blockchain and Shared Economy Applications", Procedia Computer Science. Elsevier B.V. 98: 463., 2016, 6 pages.
International Preliminary Report on Patentability received for PCT Application No. PCT/US2018/065851, dated Jul. 9, 2020, 8 pages.
International Preliminary Report on Patentability Received for PCT Application No. PCT/US2018/065852, dated Jul. 9, 2020, 8 pages.
International Preliminary Report on Patentability received for PCT Application No. PCT/US2018/065854, dated Jul. 9, 2020, 8 pages.
International Preliminary Report on Patentability received for PCT Application No. PCT/US2018/065860, dated Jul. 9, 2020, 8 pages.
"A Tech Startup Wants To Use Blockchain To Make Event Tickets Fraud-Proof", Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.
"Blockchain in Ticketing Why do ticketing companies need it?—Softjourn", Retrieved from the Internet URL: <https://softjourn.com/blockchain-in-ticketing>, Accessed on Sep. 11, 2018, 7 pages.
"Blockchain Secure Event Ticketing For Music, Festivals And Meetups", Retrieved from the Internet URL: <https://eventchain.io/>, Accessed on Sep. 11, 2018, 9 pages.
"Blockchain Startups Take on Ticket Touting, But Will They Gain Traction?", Retrieved from the Internet URL: <https://www.coindesk.com/blockchain-startups-take-ticket-touting-will-gain-traction/>, Jul. 31, 2017, 5 pages.
"Blocktix—An Ethereum event hosting platform designed for the real world", Retrieved from the Internet URL: <https://blog.blocktix.io/blocktix-an-ethereum-event-hosting-platform-designed-for-the-real-world-d52f8a838ecc>, Jan. 25, 2017, 3 pages.
"Cloudchain—Ticketing Platform Based On Blockchain—Reply", Retrieved from the Internet URL: <http://www.reply.com/en/content/blockchain-ticketing-solution-cloudchain>, Accessed on Sep. 11, 2018, 3 pages.
"Crypto.tickets", Retrieved from the Internet URL: <https://blog.crypto.tickets/>, Accessed on Sep. 11, 2018, 2 pages.
"Ethereum Wallets are Enabling Transaction Scheduling, Killer Feature", Ethereum News, Retrieved from the Internet URL: <https://www.ccn.com/ethereum-wallets-are-enabling-transaction-scheduling-killer-feature/>, Sep. 18, 2018, 6 pages.
"GUTS Tickets—Honest ticketing", Retrieved from the Internet URL: <https://guts.tickets/>, Accessed on Sep. 11, 2018, 9 pages.
"How can a contract run itself at a later time?", Retrieved from the Internet URL:<https://ethereum.stackexchange.com/questions/42/how-can-a-contract-run-itself-at-a-later-time>, Accessed date on Sep. 24, 2018, 12 pages.
"The Alarm Service Is Now Available On The Testnet", Retrieved from the Internet URL: <http://blog.ethereum-alarm-clock.com/blog/2016/1/16/the-alarm-service-is-now-available-on-the-testnet>, Jan. 16, 2016, 2 pages.
"The Aventus Protocol: Blockchain for Ticketing", Retrieved from the Internet URL: <https://aventus.io/>, Accessed on Sep. 11, 2018, 9 pages.
"Upgraded Tickets", Retrieved from the Internet URL: <https://www.upgraded-inc.com/>, Accessed on Sep. 11, 2018, 14 pages.
Biddeer Coin, Biddeer Coin White Paper, v1.0, Dec. 28, 2017, 36 pages.
Chainfrog, "What are Smart Contracts?", Retrieved from the Internet URL: <http://www.chainfrog.com/wp-content/uploads/2017/08/smart-contracts.pdf>, 2017, 13 pages.
Chen, et al., "Under-Optimized Smart Contracts Devour Your Money", Retrieved from the Internet URL: <https://arxiv.org/pdf/1703.03994.pdf >, Mar. 11, 2016, 5 pages.
Gollapudi, "White Paper—A Next-Generation Smart Contract and Decentralized Application Platform", Retrieved from the Internet URL: < https://github.com/ethereum/wiki/wiki/White-Paper/f18902f4e7fb21dc92b37e8a0963eec4b3f4793a >, May 29, 2017, pp. 1-23.
Kehrli, "Blockchain Explained", Retrieved from the Internet URL: <https://www.niceideas.ch/blockchain_explained.pdf>, Oct. 7, 2016, pp. 1-25.
Szabo, "Smart Contracts: Building Blocks for Digital Markets", Retrieved online from the Internet URL: <http://www.alamut.com/subj/economics/nick_szabo/smartContracts.html>, 1996, pp. 1-17.
Triantafyllidis, "Developing an Ethereum Blockchain Application", Retrieved from the Internet URL: <http://www.delaat.net/rp/2015-2016/p53/report.pdf >, Feb. 19, 2016, 59 pages.
Chronologic, "Temporal Innovation on the Blockchain", Retrieved from the Internet URL: <https://chronologic.network/uploads/Chronologic_Whitepaper.pdf>, Oct. 11, 2018, 25 pages.
Ramachandran, "Using Blockchain And Smart Contracts For Secure Data Provenance Management," Sep. 28, 2017, pp. 1-11.
Non-Final Office Action Received for U.S. Appl. No. 15/858,949, dated Aug. 30, 2019, 10 pages.
Notice Of Allowance received for U.S. Appl. No. 15/858,949, dated Feb. 3, 2020, 6 pages.
Response to Non-Final Office Action filed on Nov. 21, 2019, for U.S. Appl. No. 15/858,949, dated Aug. 30, 2019, 14 pages.
Non-Final Office Action received for U.S. Appl. No. 16/020,975, dated Feb. 28, 2020, 12 pages.
Non Final Office Action Received for U.S. Appl. No. 16/181,814, dated Feb. 20, 2020, 20 pages.
Non Final Office Action Received for U.S. Appl. No. 16/041,680, dated Feb. 26, 2020, 10 pages.

(56) References Cited

OTHER PUBLICATIONS

Kishigami, et al., "The Blockchain-Based Digital Content Distribution System", 2015 IEEE Fifth International Conference on Big Data and Cloud Computing, Aug. 1, 2015, pp. 187-190.
International Search Report received for PCT Application No. PCT/US2018/065852, dated Feb. 19, 2019, 4 pages.
International Written Opinion received for PCT Application No. PCT/US2018/065852, dated Feb. 19, 2019, 6 pages.
International Search Report received for PCT Application No. PCT/US2018/065854, dated Feb. 21, 2019, 3 pages.
Written Opinion received for PCT Patent Application No. PCT/US2018/065854, dated Feb. 21, 2019, 6 pages.
International Search Report received for PCT Application No. PCT/US2018/065860, dated Feb. 19, 2019, 3 pages.
International Written Opinion received for PCT Application No. PCT/US2018/065860, dated Feb. 19, 2019, 6 pages.
Steichen, et al., "Blockchain-Based, Decentralized Access Control for IPFS", Retrieved from the Internet URL: <https://www.researchgate.net/publication/327034734>, Jul. 2018, 9 pages.
White Paper, "White Paper: PGP Key Management Server from Symantec", An Introduction to PGP Key Management Server from Symantec, 2010, 17 pages.
Zhang, "Orthogonality Between Key Privacy and Data Privacy", ResearchGate, Revisited, Conference Paper, Aug. 2007, 17 pages.
Ateniese et al., "Redactable Blockchain—or—Rewriting History in Bitcoin and Friends", IEEE European Symposium On Security And Privacy, May 11, 2017, 38 pages.
International Search Report received for PCT Application No. PCT/US2018/065851, dated Feb. 18, 2019, 4 pages.
International Written Opinion received for PCT Application No. PCT/US2018/065851, dated Feb. 18, 2019, 6 pages.

* cited by examiner

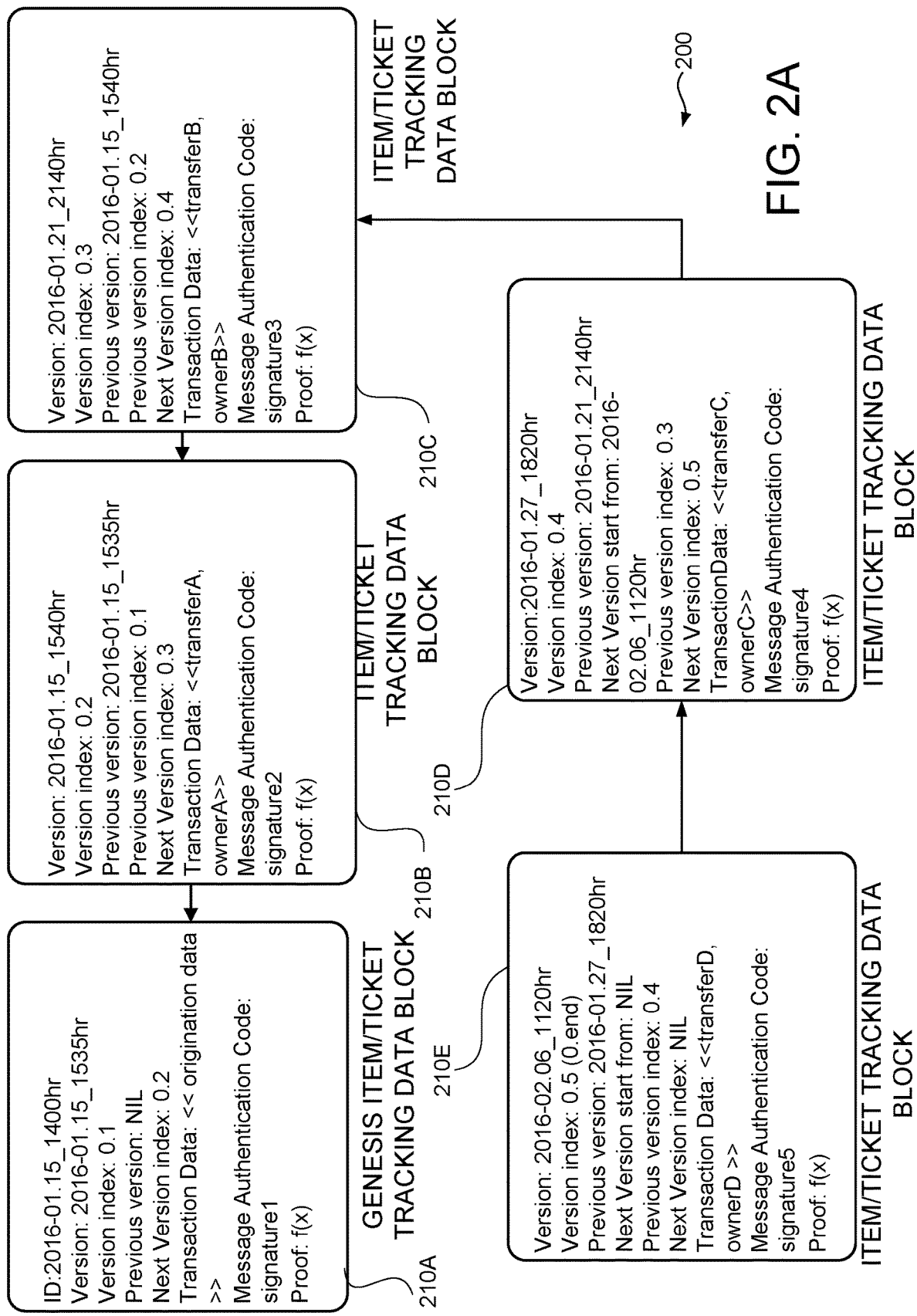

TRANSFEREE ENVIRONMENT CREATES "PROVENANCE TRACKING" BLOCK ON BLOCKCHAIN WITH TRANSFEREE AS OWNER AND TRANSFEROR, AND RELEASE PAYMENT INITIALLY SET TO FALSE
320

ITEM TRACKING DATA BLOCK STATE
322 provenanceID:
- holder /* In possession */
- payment_req
- payment_amt
    /* amount to transfer */
- validated /* Valid transfer */

ITEM TRACKING DATA BLOCK

METHODS
Transfer(String provenanceID, paymentAmount, transferee) /* Called by transferee */
{
    validateProvenance(); /* Call to a third party
        verification environment */
    if(provenanceID.valid == true && caller == transferee)
        payment[id].payment_recipient=transferor
        provenance[id].holder=transferee
}

Complete(paymentID, provenanceID.valid, transferee)
{
if (caller == transferee && provenanceID.valid == true)
        payment[id].payment_recipient=transferor
        provenanceID.update=transferee
}

SECURE TRACKING AND TRANSFER OF ITEMS USING A BLOCKCHAIN

CROSS REFERENCE TO RELATED APPLICATIONS

This application claims the benefit of U.S. Provisional Patent Appl. No. 62/612,091 for "Enhanced Distributed Database and Data Communications Operations" filed Dec. 29, 2017, herein incorporated by reference in its entirety for all purposes.

BACKGROUND

It is challenging to be able to effectively track items and verify their authenticity, whether the items are physical or digital. For example, tracking the authenticity of an item, such as a vehicle part or a piece of art, to ensure a chain of custody or to ensure authenticity of the item through transfer from one entity to another. It is important to prevent items from being copied or counterfeited.

In another example, an event ticket may be transferred from a primary issuer to a purchaser and transferred from one purchaser to another. Tracking the event ticket through multiple transfers to final use is a challenge. It is also important to prevent tickets from being copied or counterfeited and that the tickets only be used once.

It is with respect to these and other considerations that the disclosure made herein is presented.

SUMMARY

In some examples of the disclosed technology, a blockchain smart contract (e.g., Etherum smart contract) is utilized that includes methods for the tracking of provenance between transacting parties. Such provenance tracking substantially promotes efficiency of transaction, authenticity of the products/services/digital content, credibility of transaction, mitigates disputes, and eliminates possible fraud. In examples of this aspect, a digital provenance smart contract block is associated with one or more transactions of a product/service/digital content. In certain examples, physical electronic tags, digital storage mechanisms, RFID tags, and other digital identification modalities can be used to store/retrieve/process one or more provenance tracking smart contract blocks.

Operatively, the provenance tracking of a source product, service, or digital content being stored and/or transacted on an exemplary one of these platforms can be expressed as a blockchain smart contract having therein one or more provenance indicators, certificates, or authenticators that detail the provenance history of the product, service, or digital content. In an illustrative implementation, the provenance tracking data can reside on a physical storage device resident and/or associated with the source product/service/digital content.

Operatively, the provenance block of the exemplary smart contract block chain can also be verified by a third party to ensure the integrity of the provenance historical data. Illustratively, the third party can be one or more the original manufacturer/operator/owner/provider of the source product/service/digital content.

In an example of another aspect of the disclosed technology, an issuer of an event ticket creates a blockchain smart contract representing the ticket. Transfer of the ticket from one buyer to another is tracked in the smart contract on the blockchain. A final buyer presents their credentials at a venue to gain entry. The venue uses the final buyer's credentials to validate that the final buyer owns the ticket on the blockchain and marks the ticket as used in the smart contract. The disclosed technology can support safe and traceable transfer of tickets using smart contracts on a blockchain, e.g. the Ethereum blockchain.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2A is a data architecture diagram showing an illustrative example of an item tracking data blockchain securing item transfer transactions, where each transfer of an item is secured with a new tracking data block on the blockchain;

FIG. 3B is a data architecture diagram showing an illustrative example of an item tracking data block on an item tracking data blockchain that includes code for methods for transferring items and completing transfer of items tracked the item tracking data blockchain;

DETAILED DESCRIPTION

Figure 1:
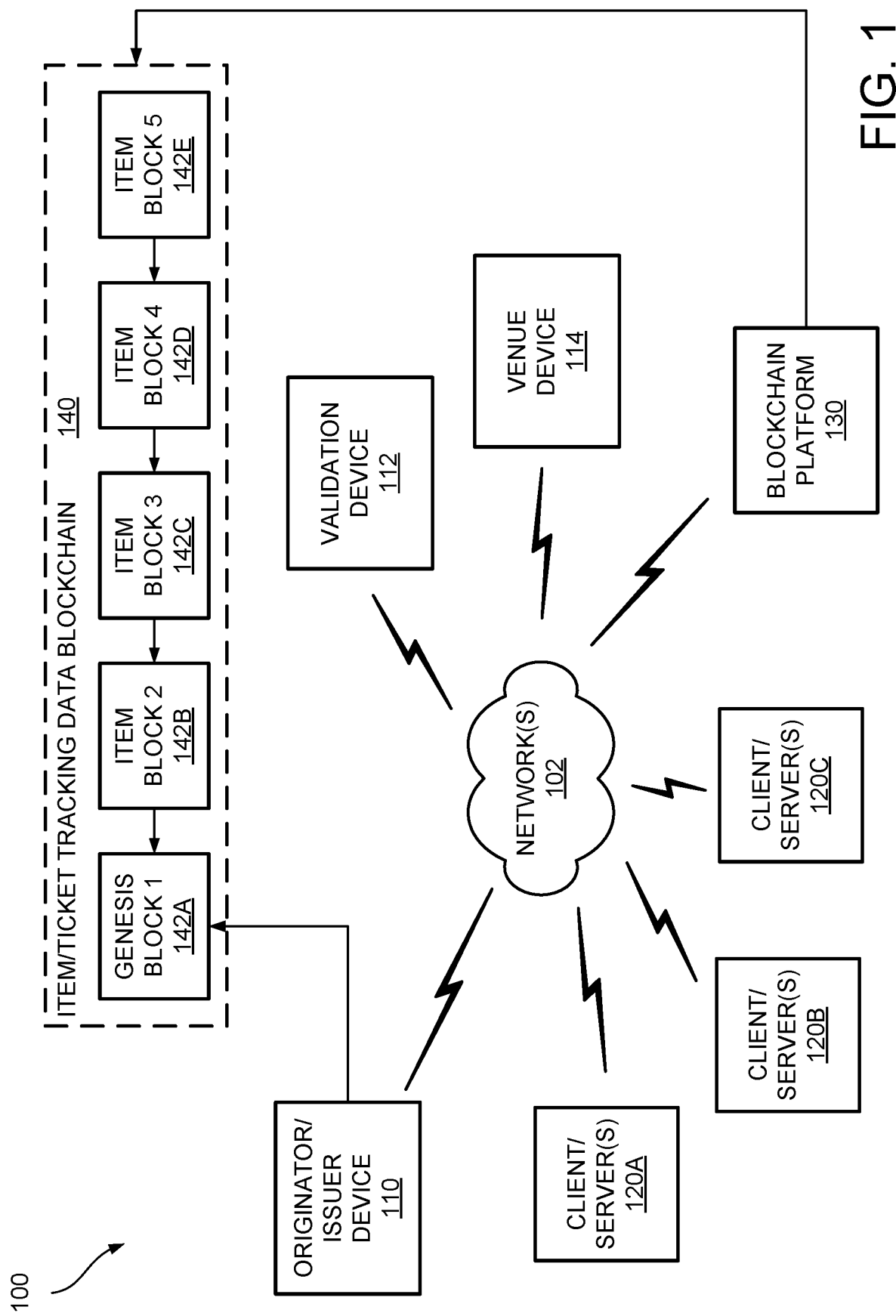
FIG. 1 is an architectural diagram showing an illustrative example of a system for an item tracking data blockchain.

In the context of e-commerce, e-tailing, digital advertising, digital media distribution and broadcast, sometimes, it is advantageous for the platform operators that allow for the transaction of products/services/digital content (including digital advertisement and software) to have available a mechanism to track the provenance of the sourced products/services/digital content to provide more certainty to the transacting parties of the authenticity of the products/services/digital content. Additionally, such provenance tracking can allow buyers of resold products to preserve the provenance of purchased products/services/digital content to maintain/sustain collectability, preserve pricing, and memorialize chain of custody among a lineage of the owners of the products/services/digital content. Conventional e-commerce, e-tailing, digital advertising, digital media distribution and broadcast platforms can be deficient from memorializing and/or tracking the provenance of products/services/digital content as they are transacted serially over time.

The following Detailed Description describes technologies for the use of a blockchain in an item tracking data management system that maintains provenance data in item tracking data blocks on an item tracking data blockchain.

An item tracking data blockchain is established by an originator or source of an item, such as a physical object or article, a service or digital content, that represents the item. An item tracking data block is created when the item is the subject of a transfer transaction and the block is linked to the blockchain. Provenance of the item can be validated by another entity, such as the originator or a validation entity, to ensure authenticity of the item. In some examples, validation of provenance of an item can result in transfer of payment from the transferee to the transferor. In some other examples, the item can include a physical electronic tag, digital storage mechanism, radio-frequency identifier (RFID) tag, or other digital identification modality that is stored in the item tracking data blockchain for the item.

A technical advantage of the disclosed item tracking data technology includes securely maintaining provenance data on a blockchain that can be publicly viewable and traceable. Another technical advantage of the disclosed item tracking data technology is the distributed nature of the blockchain, which prevents an unauthorized entity from modifying or corrupting the item tracking data at any single point.

The following Detailed Description also describes technologies for the use of a blockchain in a ticket tracking data management system that maintains ticket transfer data in ticket tracking data blocks on a ticket tracking data blockchain.

A ticket tracking data blockchain is established by an issuer of a ticket, such as a ticket entitling a bearer of the ticket to enter a venue for an event or for a service. A ticket tracking data block is created when the ticket is the subject of a transfer transaction and the ticket tracking data block is linked to the blockchain. A ticket can be repeatedly transferred and the transfer of the ticket maintained on the ticket tracking data blockchain. When the ticket is presented for use, such as at an event venue, a venue device verifies the ticket based on the ticket tracking data blockchain and marks the ticket as used to prevent reuse. In some examples, a portion of a resale price of the ticket may be sent to the issuer of the ticket.

A technical advantage of the disclosed ticket tracking data technology includes securely maintaining a ticket on a blockchain to prevent counterfeiting and to permit the ticket to be publicly verified and traced to prevent fraudulent transfers. Another technical advantage of the disclosed item tracking data technology is the distributed nature of the blockchain, which prevents an unauthorized entity from modifying or corrupting the ticket tracking data at any single point.

Conventionally, items can be copied or counterfeited and then sold as authentic items. In addition, used items can be offered as new or original condition items. It can be difficult for a potential buyer of an item to effectively determine whether an item is authentic or original before purchasing. It is particularly difficult when a potential purchaser cannot inspect the item, such as when items are offered for sale on-line through websites. If the potential buyer is uncertain about the provenance of an item, then the potential buyer may be less inclined to purchase the item or may offer a lower price reflecting their uncertainty.

Similarly, tickets, such as paper or electronic tickets, that are purchased from an issuer are often resold. However, tickets are also frequently copied, counterfeited or used and, therefore, not valid for use, e.g. not valid for entry to an event or for access to a service or digital content corresponding to the ticket. It can be difficult for a potential purchaser to determine whether the ticket is valid before purchasing the ticket. In some cases, a buyer may only discover that a ticket is invalid when the buyer presents the ticket for use. If the potential buyer is uncertain about the validity of a ticket, then the potential buyer may forego purchase of the ticket or may offer a lower price reflecting their uncertainty about the validity of the ticket.

In certain simplified examples of the disclosed technologies, a method, system or computer readable medium for provenance tracking is shown involving generating, by an originator entity, a first item tracking data block on an item tracking data blockchain. The first item tracking data block stores data identifying an item, a holder identifier for identifying a holder of the item and a validated indicator, where holder identifier is set to an identifier of the originator entity for the item and the validated indicator is set to a true state. Data in the first item tracking data block is signed with a first cryptographic digital signature of the originator entity. A first transferee entity generates a second item tracking data block on the item tracking data blockchain. The second item tracking data block stores a holder identifier and a validated indicator, where the holder identifier is set to an identifier of the first transferee entity and the validated indicator is set to the true state. The second item tracking data block is linked to the first item tracking data block and the second item tracking data block is signed with a second cryptographic digital signature of the originator entity.

In an example of this aspect of the disclosed technology, the provenance tracking involves a second transferee entity generating a third item tracking data block on the item tracking data blockchain. The third item tracking data block stores a holder identifier and a validated indicator, where the holder identifier is set to an identifier of the second transferee entity and the validated indicator is set to the false state. The third item tracking data block is linked to the second item tracking data block. In response to receiving a verification message from a third party, the validated indicator in the third item tracking block is set to true. And the third item tracking data block is signed with a cryptographic digital signature of the first transferee entity. The validated indicator in the third item tracking block can be set to true responsive to receiving the verification message from the validation party and involve transferring payment for the item to the first transferee.

In some examples, the identifier of the originator entity is a public key address for the originator entity, the identifier of the first transferee entity is a public key address for the first transferee entity, and the identifier of the second transferee entity comprises a public key address for the second transferee entity. Also, the first cryptographic digital signature of the originator entity can be partially based on data within the first item tracking data block, the second cryptographic digital signature of the originator entity can be partially based on data within the second item tracking data block, and the cryptographic digital signature of the first transferee entity can be partially based on data within the third item tracking data block.

In an example of another aspect of the disclosed technology, ticket tracking involves an issuer entity generating a first ticket tracking data block on a ticket tracking data blockchain. The first ticket tracking data block stores a unique code value for the ticket, a holder identifier for identifying a holder of the ticket and a used indicator, where holder identifier is set to an identifier of the issuer entity for the ticket and the used indicator is set to a false state. The first ticket tracking data block is signed with a first cryptographic digital signature of the issuer entity. A first transferee entity generates a second ticket tracking data block on the ticket tracking data blockchain. The second ticket tracking data block store a holder identifier, the unique code value for the ticket, and a used indicator, where the holder identifier is set to an identifier of the first transferee entity and the used indicator is set to the false state. The second ticket tracking data block is linked to the first ticket tracking data block and signed with a second cryptographic digital signature of the issuer entity.

In some examples of this aspect of the disclosed technology, if the used indicator is set to the false state, a second transferee entity generates a third ticket tracking data block on the ticket tracking data blockchain. The third ticket tracking data block stores a holder identifier, the unique code value for the ticket, and a used indicator, where the holder identifier is set to an identifier of the second transferee entity and the used indicator is set to the false state. The third ticket tracking data block is linked to the second ticket tracking data block and signed with a cryptographic digital signature of the first transferee entity.

In certain examples of this aspect of the disclosed technology, a presented code value is received from the second transferee entity. If the used indicator stored in the third ticket tracking data block is set to the false state and the presented code value corresponds to the unique code value stored in the third ticket tracking data block, then the ticket is indicated as valid and the used indicator is set to the true state.

In still other examples of this aspect of the disclosed technology, the second ticket tracking data block stores a price value that is set to the first transfer price from the issuer entity to the first transferee entity. When the third ticket tracking data block is generated, a determination is made as to whether a second transfer price for the transfer from the first transferee entity to the second transferee entity is greater than the first transfer price. If the second transfer price is greater than the first transfer price, then a payment is sent from the first transferee to the issuer entity.

Yet another aspect of the disclosed technology involves tracking a ticket on a ticket tracking data blockchain, where the ticket tracking data blockchain stores a unique code value for the ticket, a holder identifier for identifying a holder of the ticket and a used indicator indicating whether the ticket has been used. This aspect involves generating a first ticket tracking data block on a ticket tracking data blockchain if the used indicator indicates that the ticket has not been used. The first ticket tracking data block stores an identifier of a first transferee entity in a holder identifier of the first ticket tracking data block. The first ticket tracking data block is linked to a previous ticket tracking data block on the ticket tracking data blockchain and signed with a cryptographic digital signature of a transferor entity identified in the holder identifier stored in the previous ticket tracking data block.

Some examples of this aspect of the disclosed technology include generating a second ticket tracking data block on the ticket tracking data blockchain responsive to a second transfer request if the used indicator indicates that the ticket has not been used. The second identifier ticket tracking data block stores an identifier of a second transferee entity in the holder identifier. The second ticket tracking data block is linked to a first ticket tracking data block on the ticket tracking data blockchain and signed with a cryptographic digital signature of the first transferee entity identified in the holder identifier stored in the first ticket tracking data block.

Certain examples of this aspect of the disclosed technology involve receiving a presented holder identifier and a presented code value. If the used indicator indicates that the ticket has not been used, the presented holder identifier corresponds to the holder identifier in the a most recent ticket tracking data block in the ticket tracking data blockchain, and the presented code value corresponds to the unique code value stored in the ticket tracking data blockchain, then the ticket is indicated as valid and the used indicator in the ticket tracking data blockchain is set to indicate that the ticket has been used.

Yet other examples of this aspect of the disclosed technology involve determining whether a second transfer price value for the transfer from the first transferee entity to the second transferee entity is greater than the first transfer price value and, if the second transfer price value is greater than the first transfer price value, send a payment from the first transferee to an issuer entity.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, an item or ticket tracking data blockchain is used to securely maintain data on a blockchain that can be widely distributed and accessed. In an item tracking data blockchain, item tracking data blocks securely maintain provenance data for an item, such as an object, a service or digital content, in a manner that provides wide access to the data so that the provenance of the item can be readily traced by many users who have access to the blockchain. In a ticket tracking data blockchain, the ticket tracking data blockchain represents the ticket and the ticket tracking data blocks track transfer of the ticket from issuance to use in a manner that provides wide access to the ticket transfer data to users so that the validity of the ticket can be readily established using secure, widely available information from the blockchain. For increased transparency, code for transferring an item or ticket can be included in the item or ticket tracking data blocks Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for an item tracking data blockchain ledger will be described. As will be described in more detail below with respect to the figures, there are a number of applications and services that may embody the functionality and techniques described herein.

FIG. 1 is an architectural diagram showing an illustrative example of an item or ticket tracking system 100 utilizing an item or ticket tracking data blockchain 140. An item tracking data blockchain can be utilized to securely maintain data pertaining to the provenance of an item, such as an object, service or digital content, and track transfers of the item. A ticket tracking data blockchain can be utilized to securely distribute a ticket, such as a ticket for an event or a service, and track transfers of the tickets from issuance to use. In the embodiment of FIG. 1, blockchain 140 can be a publicly available blockchain that supports scripting, such the ETHEREUM blockchain, which supports a SOLIDIFY scripting language, or BITCOIN, which supports a scripting language called SCRIPT.

An item originator or ticket issuer device 110 initiates item or ticket tracking data blockchain 140 by creating genesis block 142A. For an item tracking data blockchain, genesis data block 142A, in this example, can include information identifying an item, such as a unique serial number or tracking number, and information identifying the originator. Other descriptive data for the item, such as manufacturer, part number, date of manufacture, color, size, etc., can also be included in genesis data block 142A in some applications. In other applications, the genesis data block 142A may include the item itself, such as a digital audio, video or photo file.

For a ticket tracking data blockchain, genesis data block 142A, in one example, can include a code, key or token value that constitutes the ticket itself. In some examples, the genesis data block 142A can include information relating to the ticket, such as information identifying the issuer, the date of the event or service, the venue or service provider, or a seat or box location. In other examples, the ticket may represent a service, such as a gift certificate for a massage or haircut, and genesis data block 142A can include information relating to the service, such as the service provider, valid dates for the service, or a description of the included service or services.

In some embodiments, the item originator or ticket issuer device 110 may be replaced by another computing node, such as a computer on a peer-to-peer network, or other computing device.

In the example of FIG. 1, the item information or ticket is provided by item originator or ticket issuer device 110 and secured on item or ticket tracking data blockchain 140. The information in the data blocks 142 of the blockchain can be made accessible to other entities, such as client/servers 120A, 120B or 120C or blockchain platform 130. In this example, the client/servers 120 can communicate with item originator or ticket issuer device 110 as well as a network of servers for blockchain platform 130 that supports and maintains blockchain 140. For example, the ETHERIUM blockchain platform from the ETHERIUM FOUNDATION of Switzerland provides a decentralized, distributed computing platform and operating system that provides scripting functionality.

In one example, an item originator device 110 owns and controls the data blocks 142 in item tracking data blockchain 140 and can verify or validate transfers of the item represented by the item tracking data blocks 142B, 142C, 142D and 142E. In another example, a validation device 112, which can represent an authorized entity such as a certified appraiser or authorized seller, distributor or technician, can verify or validate the transfers represented by the item tracking data blocks 142B, 142C, 142D and 142E. There can be multiple authorized entities that can each utilize a validation device 112. The item tracking data blocks 142 can, in some examples, include metadata identifying entities that are authorized to verify or validate transfers of the item.

In another example, a ticket issuer device 110 owns and controls the genesis block 142A that is the ticket, but other entities, such as buyers utilizing client/server devices 120, can verify or validate transfers of the ticket represented by the ticket tracking data blocks 142B, 142C, 142D and 142E, e.g. a seller entity who holds the ticket can validate a transfer to a buyer entity when the seller entity confirms payment. In this example, a venue device 114, which represents a venue or service provider for the ticket, can mark the ticket as used when a holder of the ticket represented by the ticket tracking data blockchain 140 presents the ticket for use. There can be multiple venue devices 114 that can receive presentation of the ticket, such as handheld scanning devices utilized by ticket takers at the venue or service provider.

Although item originator or ticket issuer device 110, at least initially, maintains control over the item or ticket, the item or ticket tracking data blockchain 140 can be made accessible to other entities, such as client/servers 120, so these entities can trace the data in the blockchain to examine the validity of the item or ticket. For example, item or ticket tracking data blockchain 140 may be viewable to the public through the use of applications that can access blockchain information. By providing access to the item tracking data blockchain 140, this approach allows users to rely on the authenticity of the data file that is maintained on the item tracking data blockchain 140 under the control of the file owner, e.g. the user of item originator or ticket issuer device 110.

In another example, the item or ticket tracking data blockchain 140 may be restricted to being viewable only to entities that are authorized to access the blockchain 140, such as validation device 112 or venue device 114. By restricting access to the blockchain 140, an item originator or ticket issuer can preserve greater control over the item or ticket, such as limiting resale of the item or ticket to authorized entities.

FIG. 2A is a data architecture diagram illustrating a simplified example of an item or ticket tracking data blockchain ledger 200 based on the blocks 142A-E of the item or ticket tracking data blockchain ledger 140 of FIG. 1. The item or ticket tracking data blockchain ledger 200 example of FIG. 2A is simplified to show block headers, metadata and signatures of blocks 210A-E in order to demonstrate transfers of an item or ticket that are traceable and secure using a blockchain. In outline, a blockchain ledger may be a globally shared transactional database. Signatures can, in some examples, involve all or part of the data stored in the data the blocks 142A-E and can also involve public key addresses corresponding to entities involved in the transfers, e.g. an originator entity, a transferor entity, or a transferee entity.

The blockchain ledger 200 may be arranged as a Merkle tree data structure, as a linked list, or as any similar data structure that allows for cryptographic integrity. The blockchain ledger 200 allows for verification that provenance data or a ticket has not been corrupted or tampered with because any attempt to tamper will change a Message Authentication Code (or has) of a block, and other blocks pointing to that block will be out of correspondence. In one embodiment of FIG. 2A, each block may point to another block. A block may comprise one or more transactions. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of item or ticket tracking data blockchain 200 in the example of FIG. 2A shows transfers of the item or ticket secured with a new item or ticket tracking data block on the blockchain. In one example, item originator device 110 of FIG. 1 provides identifying and descriptive provenance data for an item when it creates genesis data block 210A. In another example, ticket issuer device 110 of FIG. 1 provides a unique identifier for a ticket, such as a code, key or token, when it creates genesis data block 210A. The item originator or ticket issuer device 110 signs the genesis block 210A and the blockchain system within which blockchain 200 is created verifies the genesis data block based on a proof function.

Note that a variety of approaches may be utilized that remain consistent with the disclosed technology. In some examples relating to provenance of an item, the item originator device 110 is a required entity or the only entity permitted to verify or validate item tracking data blocks 142 on the blockchain. In other examples, other entities, such as authorized entities, can verify or validate item tracking data blocks.

In some examples involving tracking tickets, the ticket issuer device 110 is a required entity to verify or validate ticket tracking data blocks 142 for transfer of the ticket to other entities. In other examples, the ticket issuer device 110 issues the ticket genesis data block 142A, but other entities, e.g. transferors and transferees, can verify or validate ticket tracking data blocks 142 for transfer of the ticket. In still other examples, only authorized entities, e.g. authorized ticket brokers or resellers, can verify or validate ticket tracking data blocks 142.

In the example of FIG. 2A, transaction data for a transfer transaction, such as a public key or other identifier for a transferee, is stored in the item/ticket tracking data blocks 142. Other transfer data that can be included is the date of transfer, the transfer price, a validating or verifying entity, or other information. To record a first transfer, e.g. from the originator/issuer to OwnerA, on the item/ticket tracking data blockchain ledger 200, item originator or ticket issuer device 110 or a transferor or transferee entity using, for example, client/servers 120, creates item or ticket tracking data block 210B, which identifies a transfer, e.g. transferA, and a transferee, e.g ownerA, and links block 210B to block 210A. The item originator or ticket issuer device 110 signs tracking data block 210B and commits block 210B to blockchain 200 for verification by the blockchain platform.

For a second transaction, from ownerA to ownerB in this example, ownerB, e.g. using a client/server device 120, creates item/ticket tracking data block 210C to secure transfer of the item or ticket from ownerA and links block 210C to block 210B. In the case of an item transfer, depending upon the implementation, data bock 210C can be signed by the originator entity, e.g. using originator device 110, a validation entity, e.g. using validation device 112, or ownerA, using a client/server device 120, or some predetermined combination of two or more of these entities. For example, the item tracking data block 210C can be configured to require a signature from the transferee ownerB and either the originator entity or a validation entity.

In the case of a ticket transfer, depending upon the implementation, data bock 210C can be signed by the issuer entity, e.g. using issuer device 110, a validation entity, e.g. a ticket broker entity using validation device 112, or transferor, e.g. ownerA, using a client/server device 120, or some predetermined combination of two or more of these entities. For example, the item tracking data blocks 210 can be configured to require a signature from the transferor ownerA and either the issuer entity or a validation entity. In another example, the ticket tracking data blocks 210 can be configured to require a signature from the transferee ownerB and either the issuer entity or a validation entity. In still another example, the ticket tracking data blocks 210 can be configured to simply require a signature from the transferor ownerA to effect the transfer.

Similarly, to record a transfer from ownerB to ownerC, tracking data block 210D is created, e.g. by ownerC, linked to tracking data block 210C, and signed as described above. Likewise, to record a transfer from ownerC to ownerD, tracking data block 210E is created, e.g. by ownerD, linked to tracking data block 210D, and signed as described above. In this approach, provenance of an item or validity of a ticket supported by blockchain 200 can be confirmed by tracing the transaction recorded in each of tracking data blocks 210B, 210C, 210D and 210E back to the genesis data block 210A.

Figure 2B:
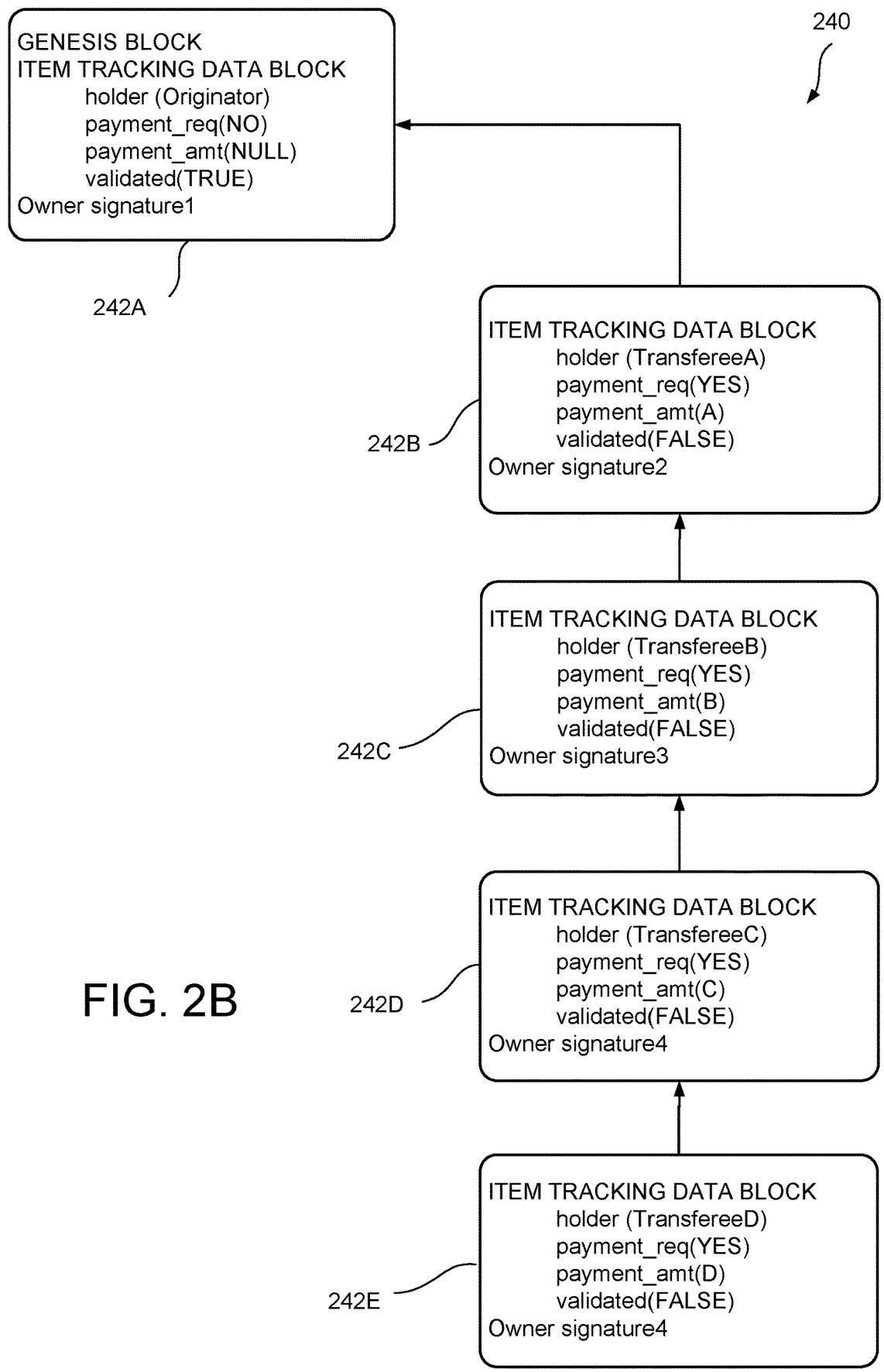
FIG. 2B is a data architecture diagram showing another illustrative example of an item tracking data blockchain where each block on the blockchain records a transfer transaction for an item.

FIG. 2B is a data architecture diagram showing another illustrative example of an item tracking data blockchain 240, where the item tracking data blocks 242 include block state indicating a current holder or owner of the item, e.g. a public key for the current owner entity, along with a payment required indicator, a payment amount indicator, and a validated indicator. To establish blockchain 240 for an item, item originator device 110 creates genesis item tracking data block 242A, which identifies the item that the block represents, indicates the originator entity, e.g. a public key or other identifier for the originator entity, as the holder, indicates that no payment is required, indicates that the payment amount is null, and indicates that the item is validated, e.g. by the originator entity.

Note that the item can include an identification modality, such as a physical electronic tag, bar code label, digital storage mechanism, radio-frequency identifier (RFID) tag, or other digital identification modality, that is stored in the item tracking data blockchain for the item. The identification modality, in some examples, can be used to validate the item.

To transfer the item from the originator to TransfereeA, item originator device 110 or transferee entity TransfereeA, depending upon the implementation, creates item tracking data block 242B, which indicates TransfereeA, e.g. a public key or other identifier for the TransfereeA entity, as the holder, indicates that payment is required, e.g. payment_req (YES), indicates that the payment amount is A, e.g. payment_amt(A), and indicates that the item needs to be validated, e.g. validated(FALSE). In this example, because the item is being transferred from the custody of originator entity who knows that the item is authentic, the originator entity block 242B as validated, e.g. validated(TRUE). When payment of payment amount A by TransfereeA is confirmed, the originator entity changes the payment required field in block 242B to indicate no payment is required, e.g. payment_req(NO), and signs block 242B.

Similarly, to transfer the item from TransfereeA to TranfereeB, TransfereeB, in this example, creates item tracking data block 242C, which indicates TransfereeB, e.g. a public key or other identifier for the TransfereeB entity, as the holder, indicates that payment is required, e.g. payment_req (YES), indicates that the payment amount is B, e.g. payment_amt(B), and indicates that the item needs to be validated, e.g. validated(FALSE).

In this example, because the item is being transferred from one transferee to another, block 242C is validated by the originator entity or a validation entity, who inspects the item to verify that it is authentic. As noted above, the item can include an identification modality, such as a physical electronic tag, bar code label, digital storage mechanism, radio-frequency identifier (RFID) tag, or other digital identification modality, that is stored in the item tracking data blockchain for the item. The identification modality, in some examples, can be used to validate the item. For example, the originator entity or validation entity, or a device associated with the originator entity or validation entity, can scan the identification modality to verify provenance.

If the item passes inspection, then the inspecting entity, e.g. the originator entity or validation entity, marks block 242C as validated, e.g. validated(TRUE). When payment of payment amount B by TransfereeB is confirmed, TransfereeA changes the payment required field in block 242C to indicate no payment is required, e.g. payment_req(NO), and signs block 242C. In some implementations, block 242C can also be signed by the originator entity or validation entity.

Item tracking data block 242D similarly secures another transfer transaction from TransfereeB to TransfereeC. Item tracking data block 242E secures still another transferee transaction from TransfereeC to TransfereeD. In some implementations, each of the tracking data blocks 242 is signed by the item originator device 110 and committed to the blockchain 240 for verification by the blockchain platform.

Figure 2C:
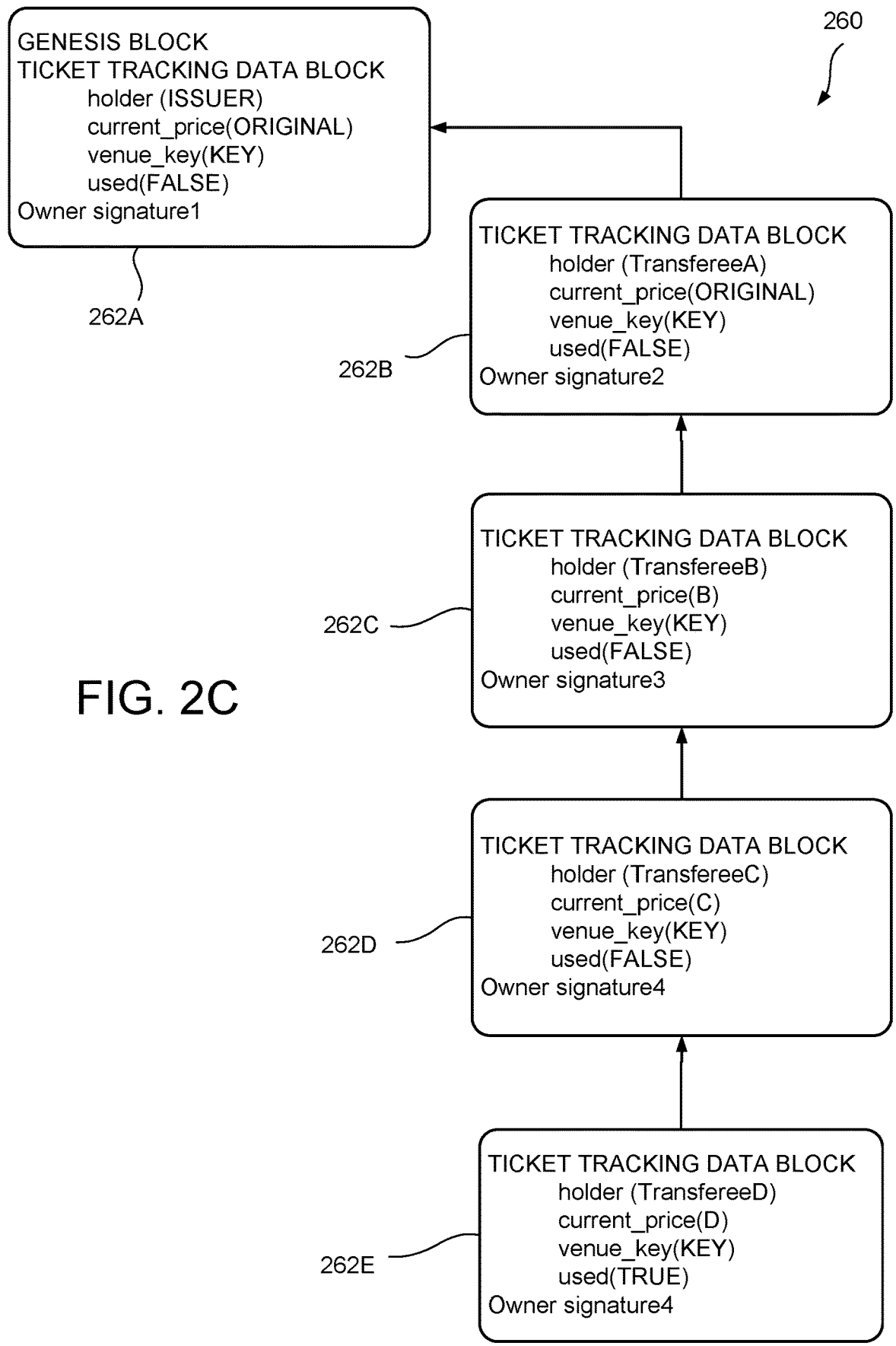
FIG. 2C is a data architecture diagram showing another illustrative example of an item tracking data blockchain pertaining to a ticket item, where each block on the blockchain records a transfer transaction for the ticket

FIG. 2C is a data architecture diagram showing another illustrative example of a ticket tracking data blockchain 260, where the ticket tracking data blocks 262 include block state indicating a current holder or owner of the ticket, e.g. a public key for the current owner entity, along with a current price field, a venue key, e.g. venue_key(KEY), which, in this example, permits a holder of the ticket to enter a venue, and a used indicator. To establish blockchain 260 for ticket, issuer device 110 creates genesis ticket tracking data block 262A, which identifies the ticket that the block represents, such as by the venue_key(KEY) value, indicates the issuer, e.g. a public key or other identifier for the issuer entity, as the holder, indicates the current price as the original price of the ticket, e.g. current_price(ORIGINAL), and indicates that the ticket has not been used, e.g. used(FALSE). Note that the venue key value can be encrypted, signed or otherwise ciphered in a manner that permits the issuer entity to verify that the ticket is valid, but prevents counterfeiters or other malicious actors from obtaining the valid venue key secured on blockchain 260.

To transfer the item from the originator to TransfereeA, issuer device 110 or transferee entity TransfereeA, depending upon the implementation, creates ticket tracking data block 262B, which indicates TransfereeA, e.g. a public key or other identifier for the TransfereeA entity, as the holder, indicates that the ticket is being transferred at the original price, e.g. current_price(ORIGINAL), includes the venue_key(KEY), and indicates that the ticket has not been used. When payment of original price by TransfereeA is confirmed, the issuer entity signs block 262B to complete transfer of the ticket to TransfereeB.

Similarly, to transfer the ticket from TransfereeA to TransfereeB, in this example, TransfereeB creates ticket tracking data block 262C, which indicates TransfereeB, e.g. a public key or other identifier for the TransfereeB entity, as the holder, indicates the current price, e.g. current_price(B), includes the venue_key(KEY), and indicates that the ticket has not been used. When payment of the current price by TransfereeB is confirmed, TransfereeA signs block 262B to complete transfer of the ticket to TransfereeB.

Ticket tracking data block 262D similarly secures another ticket transfer transaction from TransfereeB to TransfereeC at current price C. Ticket tracking data block 262E secures still another transferee transaction from TransfereeC to TransfereeD at current price D. In some implementations, each of the tracking data blocks 262 is also signed by the issuer device 110 or an authorized broker entity and committed to the blockchain 260 for verification by the blockchain platform.

When the current holder of the ticket, TransferreeD in this example, presents the ticket to a venue device 114 at the venue, the venue device verifies the ticket and marks ticket tracking data block 262E as used, e.g. used(TRUE). For example, TransferreeD uses client/server device 120A to present venue_key(KEY) in the form of a bar code that is scanned by venue device 114, which verifies that the KEY value is valid.

Figure 3A:
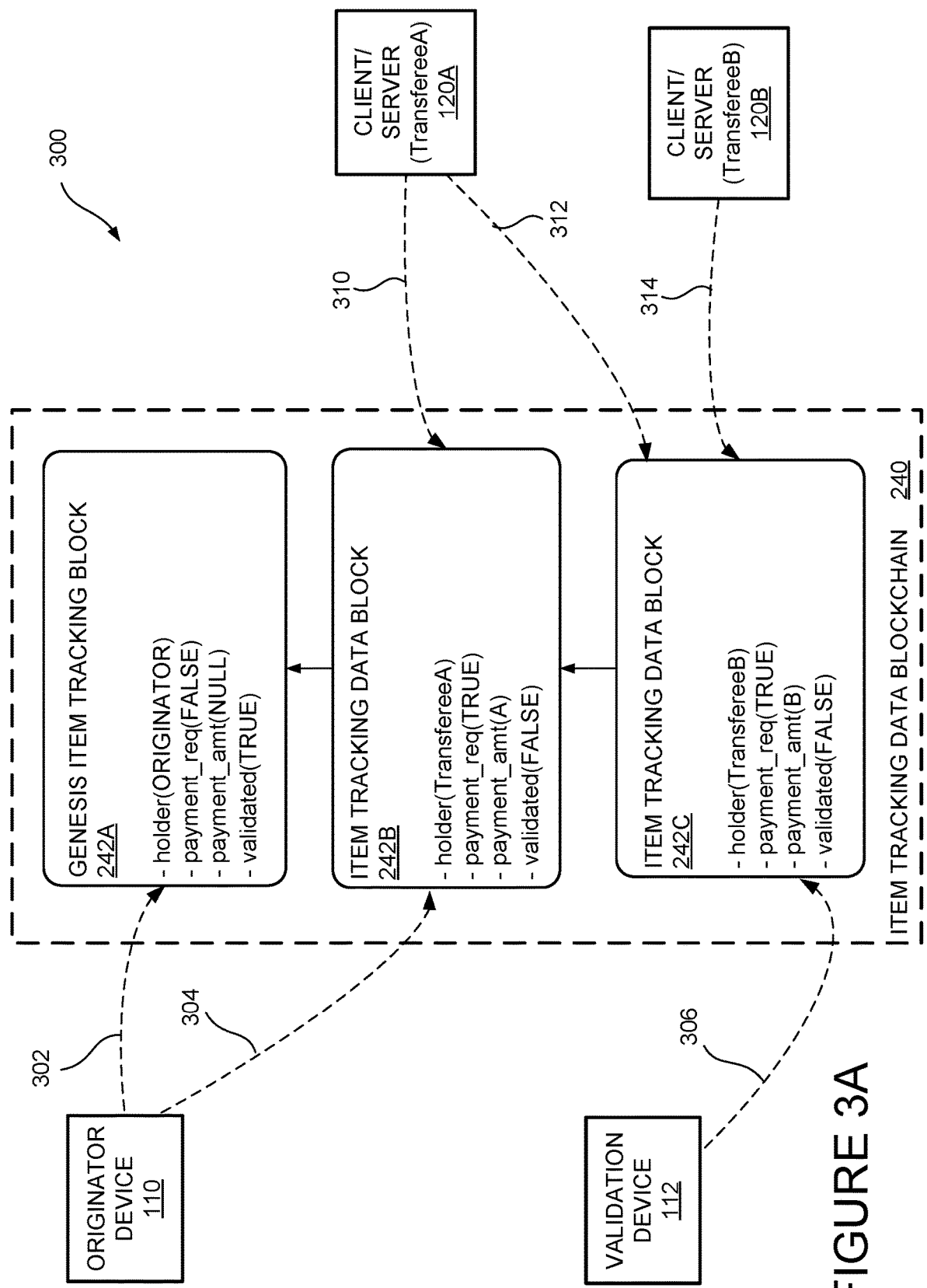
FIG. 3A is a data architecture diagram showing an illustrative example of an originator of an item creating an item tracking data blockchain for tracking transfer transactions for the item through multiple transfers of the item, where the transactions can be validated.

An item tracking data blockchain, such as blockchain 140 in FIG. 1 or blockchain 240 in FIG. 2B, enables provenance information for an item to be securely stored and tracked through multiple transfers of ownership of the item. FIG. 3A is a data architecture diagram showing a simplified illustrative example of the use of an item tracking data blockchain for securely storing provenance information for an item. In this example, an item is transferred from an originator entity using originator device 110 to a TransferreeA entity using client/server entity 120A. Subsequently, the item is transferred from TransfereeA to a TransfereeB entity who uses client/server entity 120B. A validation entity using validation device 112 is used to validate the transfer from TransfereeA to TransfereeB.

In this illustrative scenario 300 and as described above, at 302, genesis block 242A is created by item originator device 110 with the originator entity as holder and the block marked as validated, e.g. validated(TRUE). FIG. 3B provides an example of an item tracking data block 242 with methods defined for interacting with the block.

To transfer the item from the originator to TransfereeA, in this example, at 310, TranfereeA, using client/server 120A, creates item tracking data block 242B, which indicates TransfereeA as the holder, payment is required, an amount of payment A, and validation is needed, and links block 242B to block 242A. When payment of the payment amount, e.g. payment_amt(A), is confirmed, originator device 110, at 304, in this example, sets payment_req to FALSE, sets validated to TRUE, and signs item tracking data block 242B to commit the transfer to TransfereeA. Once the transfer is committed, the blockchain platform for the blockchain verifies block 242B, which is added to all copies of the blockchain 240.

To transfer the item from the TransfereeA to TransfereeB, in this example, at 314, TranfereeB, using client/server 120B, creates item tracking data block 242C, which indicates TransfereeB as the holder, payment is required, an amount of payment B, and validation is needed, and links block 242C to block 242B. At 306, a validation entity using validation device 112, after having confirmed the authenticity of the item, sets validated to TRUE and, in this example, signs data in item tracking data block 242B, such as data relating to the validated field. When payment of the payment amount, e.g. payment_amt(B), is confirmed, Transferree A, at 312, sets payment_req to FALSE, and signs data in item tracking data block 242B, such as data relating to the payment_req field, to commit the transfer to TransfereeB. Once the transfer is committed, the blockchain platform for the blockchain verifies the block 242C, which is added to all copies of the blockchain 240.

In the example of FIG. 3A, the provenance of the item can be obtained by tracing the blocks of item tracking data blockchain 240 to the genesis block 242A. The disclosed technology enables the item provenance data to be securely stored and traced on the item tracking data blockchain 240. The blockchain 240 can be made widely accessible for review, such as by potential purchasers or users. The signatures in each of the blocks 242 ensures the authenticity of the provenance data and transfers.

Scripts for transfer of an item and completion of a transfer transaction can be secured by the item tracking data blocks 242 of item tracking data blockchain 240 and executed by the operating system of the decentralized, distributed blockchain platform. FIG. 3B is a data architecture diagram showing an illustrative example of item tracking data block 242 that includes the Transfer and Complete scripts. Also shown is a process 320 in a blockchain environment that creates an item tracking data block 242. An example of block state 322 defined for the item tracking data blocks 242 is also shown.

In this example, the Transfer script is called by a transferee with an identifier for the item, e.g. provenanceID. The Transfer script invokes a function validateProvenance( ) to call a third party verification environment to validate the item for the transaction and set up payment to the transferor. In this example, the transferee calls the Complete script to complete the transfer of payment to the transferor.

Figure 3C:
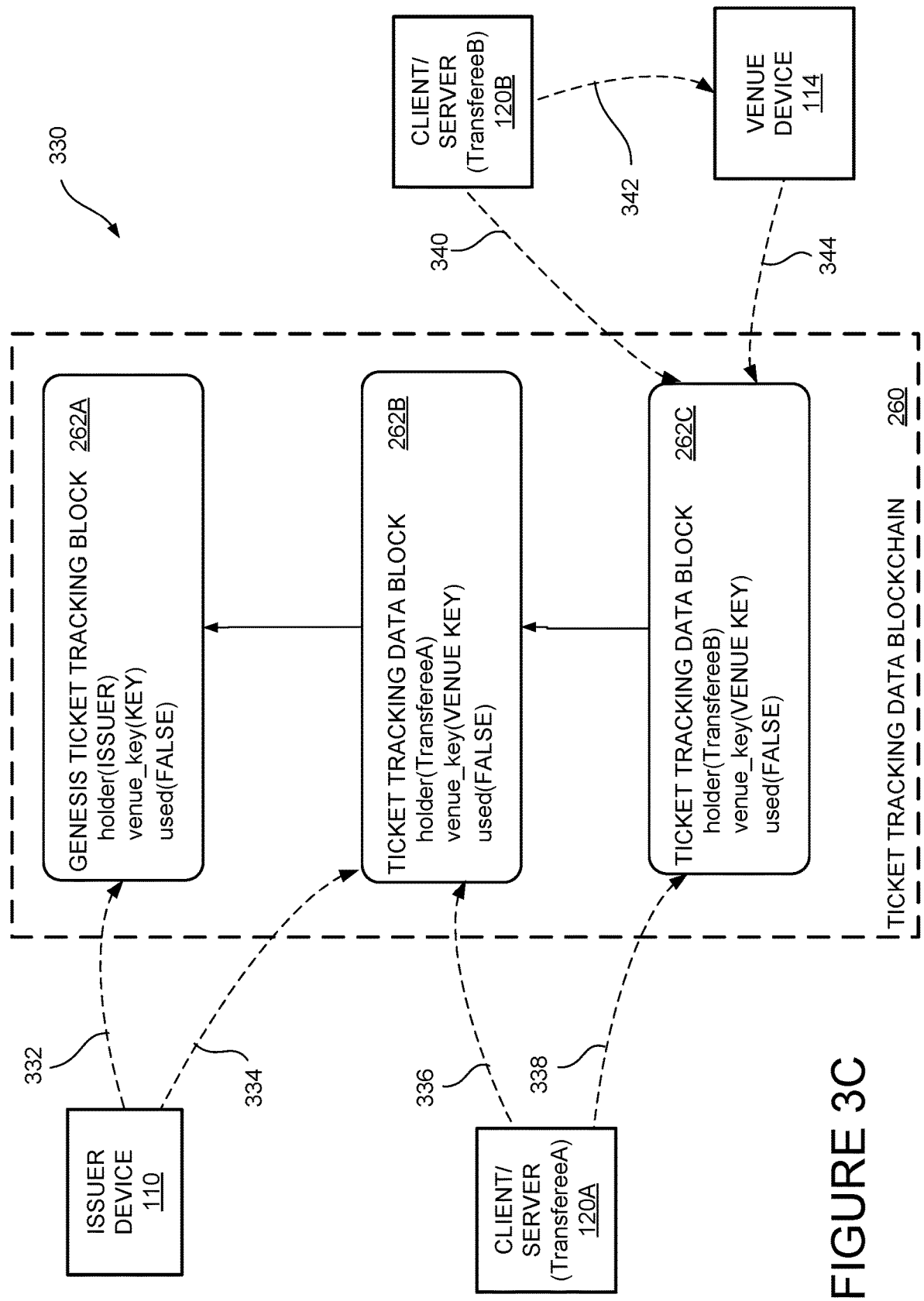
FIG. 3C is a data architecture diagram showing an illustrative example of a ticket issuer creating ticket tracking data blockchain for tracking transfer transactions for the ticket through multiple transfers of the ticket to final use at a venue.

FIG. 3C is a data architecture diagram showing a simplified illustrative example of the use of a ticket tracking data blockchain 260 for securely tracking transfers of a ticket on the blockchain. In this example, ticket is transferred from an issuer entity using issuer device 110 to a TransferreeA entity using client/server entity 120A. Subsequently, the ticket is transferred from TransfereeA to a TransfereeB entity who uses client/server entity 120B. A venue entity using venue device 114 is used to validate the ticket upon presentation by TransfereeB and mark the ticket as used.

Figure 3D:
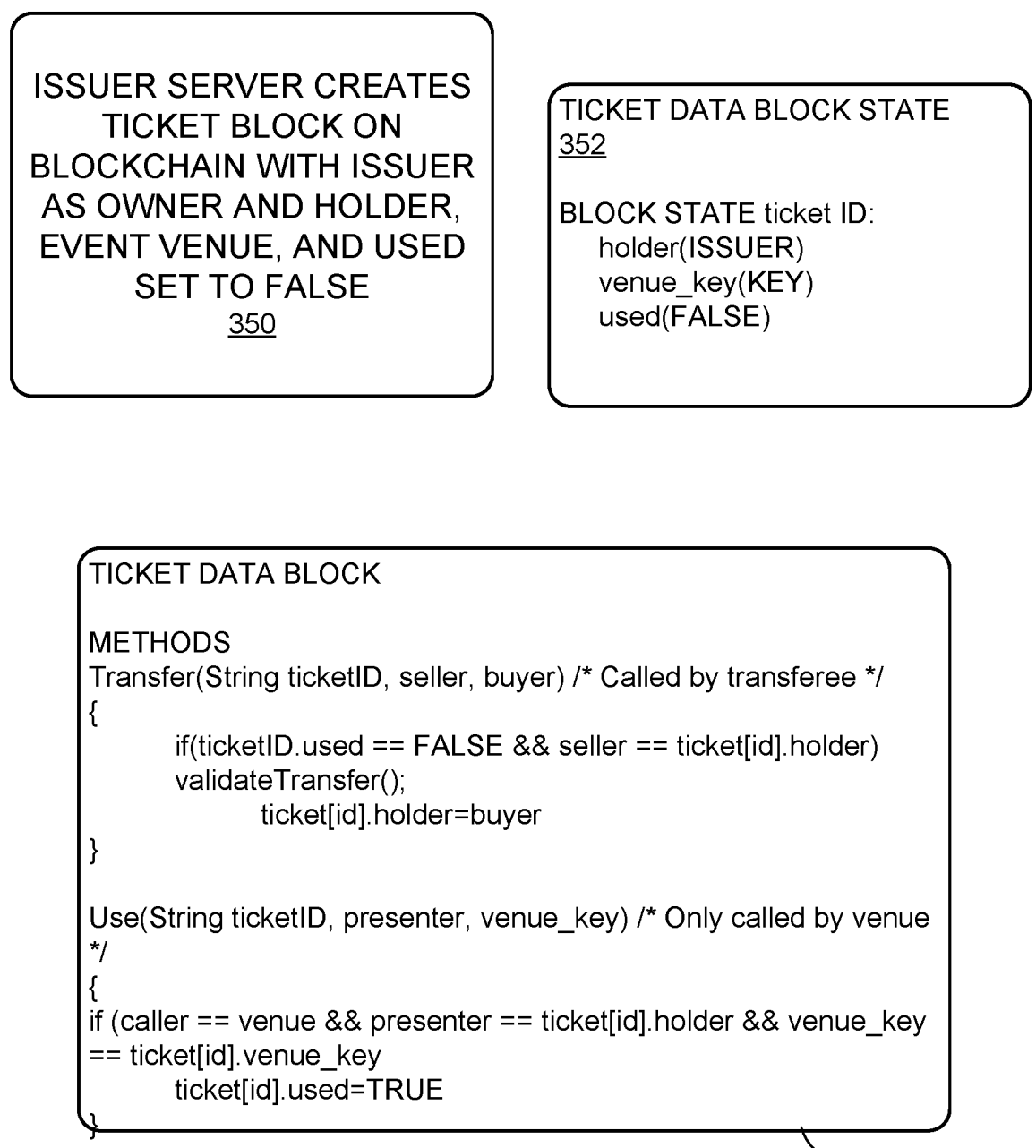
FIG. 3D is a data architecture diagram showing an illustrative example of a ticket tracking data block on a ticket tracking data blockchain that includes code for methods for transferring a ticket and using the ticket at a venue.

In this illustrative scenario 330 and as described above, at 332, genesis block 262A is created by issuer device 110 with the issuer entity as the holder, e.g. holder(ISSUER), the venue key for the ticket, e.g. venue_key(KEY), and the block is marked as not used, e.g. used(FALSE). FIG. 3D provides an example of a ticket tracking data block 262 with methods defined for interacting with the blocks 262.

To transfer the ticket from the issuer to TransfereeA, in this example, at 336, TransfereeA, using client/server 120A, creates ticket tracking data block 262B, which indicates TransfereeA as the holder and links block 262B to block 262A. The issuer entity 110, at 334, signs block 262B to confirm the transfer and commit block 262B to blockchain 260. For example, issuer entity can sign block 262B once it confirms payment. Once the transfer is committed, the blockchain platform for the blockchain verifies block 262B, which is added to all copies of the blockchain 260.

To transfer the ticket from the TransfereeA to TransfereeB, in this example, at 340, TranfereeB, using client/server 120B, creates ticket tracking data block 262C, which indicates TransfereeB as the holder and links block 262C to block 262B. At 338, TransfereeA signs block 262C to confirm the transfer and commit block 262C to blockchain 260. For example, TransfereeA can sign block 262C once it confirms payment. Once the transfer is committed, the blockchain platform for the blockchain verifies block 262C, which is added to all copies of the blockchain 260.

In this example, TransfereeB, using client/server 120B, at 342, presents the ticket to a venue or service provider entity using venue device 114. Venue device 114, confirms the validity of the ticket using venue_key(KEY) and, at 344, sets the used field to TRUE so that the ticket cannot be reused.

In the example of FIG. 3C, the validity of the ticket can be confirmed by tracing the blocks 262 of ticket tracking data blockchain 260 to the genesis block 262A. The disclosed technology enables the ticket to be securely stored and transferred on the ticket tracking data blockchain 260. The blockchain 260 can be made widely accessible for review, such as by potential purchasers, to confirm validity of the ticket. The signatures in each of the blocks 262 ensures the authenticity of the ticket and transfers.

Scripts for transfer and use of a ticket can be secured by the ticket tracking data blocks 262 of ticket tracking data blockchain 260 and executed by the operating system of the decentralized, distributed blockchain platform. FIG. 3D is a data architecture diagram showing an illustrative example of ticket tracking data block 262 that includes the Transfer and Use scripts. Also shown is a process 350 in a blockchain environment that creates a ticket tracking data block 262. An example of block state 352 defined for the ticket tracking data blocks 262 is also shown.

In this example, the Transfer script is called by a transferee with an identifier for the ticket, e.g. ticketID, an identifier for the seller, e.g. a public key address for the transferor entity, and an identifier for the buyer, e.g. a public key address for the transferee. If the ticket has not been used, e.g. ticketID.used==FALSE, and the seller identifier matches the ticket holder, e.g. seller==ticket[id].holder, then, in this example, the Transfer script invokes a function validateTransfer( ) to validate the venue_key and, if the key is valid, set the buyer as the current holder of the ticket, e.g. ticket[id].holder=buyer.

The Use script is called by a venue device with the identifier for the ticket, e.g. ticketID, an identifier for the presenter, e.g. a public key address for the entity presenting the ticket, and the venue_key value as presented by the presenter. If the caller is the venue, the presenter is the holder, e.g. presenter==ticket[id].holder, and the presented venue_key matches the ticket venue_key value, e.g. venue_key==ticket[id].venue_key, then the venue device 114 sets the used field for the ticket to TRUE.

Figure 3E:
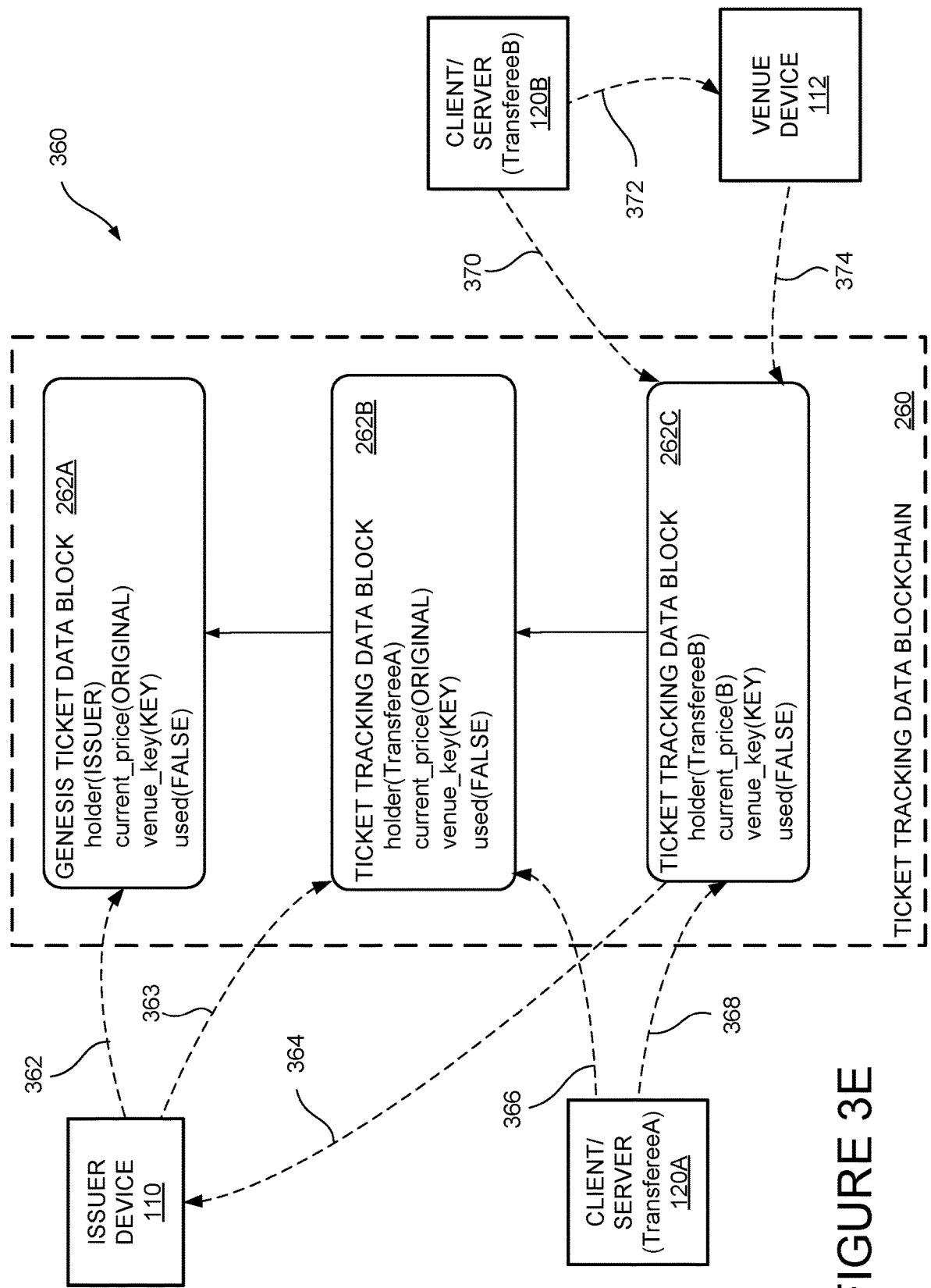
FIG. 3E is a data architecture diagram showing an illustrative example of a ticket issuer creating ticket tracking data blockchain for tracking transfer transactions for the ticket through multiple transfers of the ticket to final use at a venue, where a portion of an increase in price in a transfer can be sent to the issuer.

FIG. 3E is a data architecture diagram showing another simplified illustrative example of the use of a ticket tracking data blockchain 260 for securely tracking transfers of a ticket on the blockchain and also tracking a current price of the ticket so that a portion of an increase in ticket price can be sent to the issuer entity. In this example, the ticket is transferred at an ORIGINAL price from an issuer entity using issuer device 110 to a TransferreeA entity using client/server entity 120A. Subsequently, the ticket is transferred from TransfereeA to a TransfereeB entity who uses client/server entity 120B at a new price B, which is higher than the ORIGINAL price resulting in a transfer of a portion of the price increase to the issuer. A venue entity using venue device 114 is used to validate the ticket upon presentation by TransfereeB and mark the ticket as used.

Figure 3F:
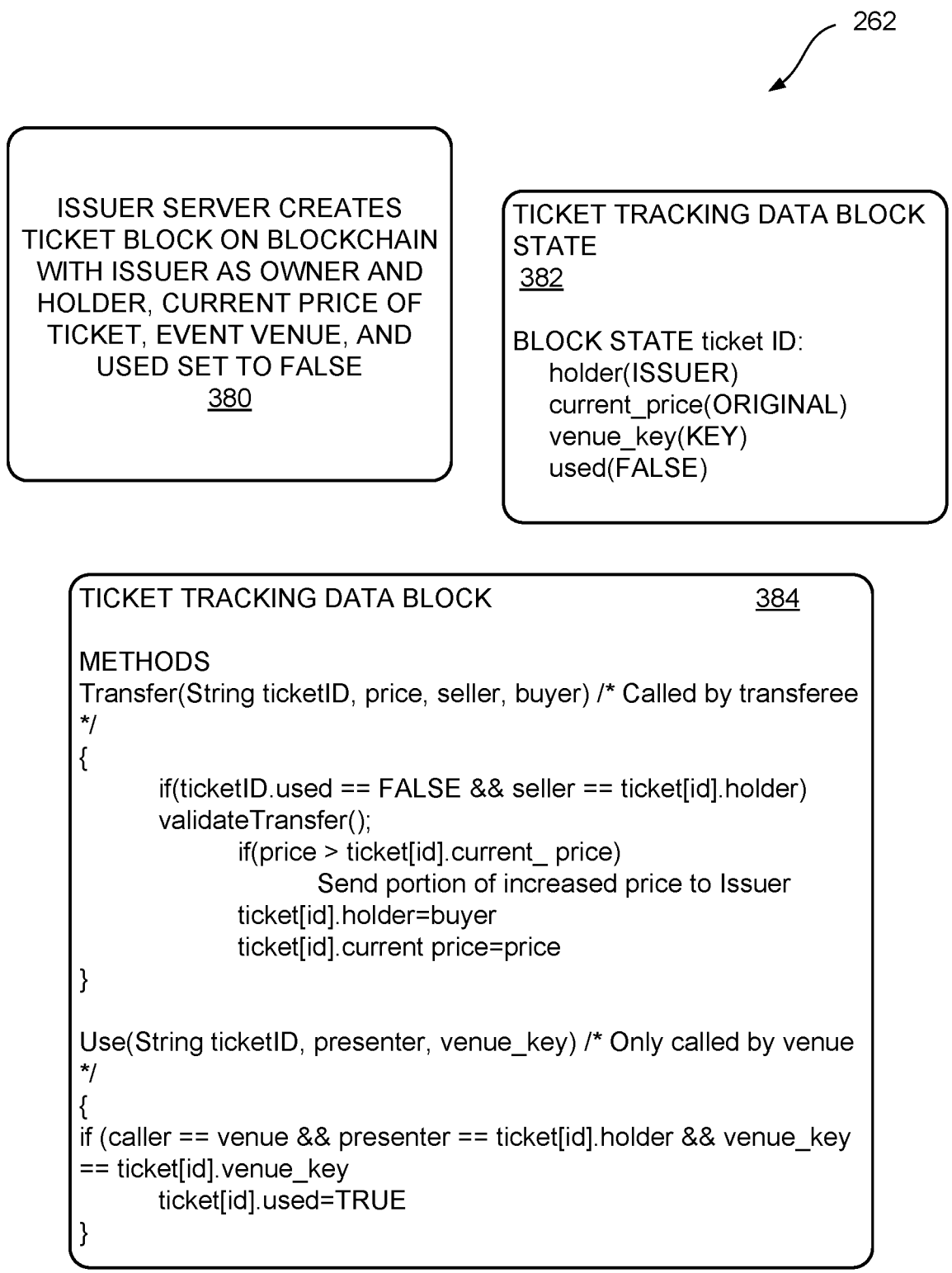
FIG. 3F is a data architecture diagram showing an illustrative example of a ticket tracking data block on a ticket tracking data blockchain that includes code for methods for transferring a ticket and transferring a portion of the an increase in price to the issuer as well as using the ticket at a venue.

In this illustrative scenario 360 and as described above, at 362, genesis ticket tracking data block 262A is created by issuer device 110 with the issuer entity as the holder, e.g. holder(ISSUER), the current price of the ticket, e.g. current_price(ORIGINAL), the venue key for the ticket, and the block is marked as not used, e.g. used(FALSE). FIG. 3F provides an example of a ticket tracking data block 262 with methods defined for interacting with the blocks 262.

To transfer the ticket from the issuer to TransfereeA at the ORIGINAL price, in this example, at 366, TransfereeA, using client/server 120A, creates ticket tracking data block 262B, which indicates TransfereeA as the holder with current_price(ORIGINAL) and links block 262B to block 262A. The issuer entity 110, at 363, signs block 262B to confirm the transfer and commit block 262B to blockchain 260. For example, issuer entity can sign block 262B once it confirms payment. Once the transfer is committed, the blockchain platform for the blockchain verifies block 262B, which is added to all copies of the blockchain 260.

To transfer the ticket from the TransfereeA to TransfereeB at price B, in this example, at 370, TransfereeB, using client/server 120B, creates ticket tracking data block 262C, which indicates TransfereeB as the holder with the current_price(B) and links block 262C to block 262B. At 368, TransfereeA signs block 262C to confirm the transfer and commit block 262C to blockchain 260. For example, TransfereeA can sign block 262C once it confirms payment. In this example, a method executes for ticket tracking data block 262C that determines a portion of the current_price(B) to be sent to the issuer entity and, at 364, sends this portion to the issuing entity. Once the transfer is committed, the blockchain platform for the blockchain verifies block 262C, which is added to all copies of the blockchain 260.

In this example, TransfereeB, using client/server 120B, at 372, presents the ticket to a venue or service provider entity using venue device 114. Venue device 114, confirms the validity of the ticket using venue_key(KEY) and, at 374, sets the used field to TRUE so that the ticket cannot be reused.

FIG. 3F is a data architecture diagram showing an illustrative example of ticket tracking data block 262 that includes the Transfer and Use scripts. Also shown is a process 380 in a blockchain environment that creates a ticket tracking data block 262. An example of block state 382 defined for the ticket tracking data blocks 262 is also shown. The example of FIG. 3F is similar to the example of FIG. 3D but with the addition of code in the Transfer script that determines whether the price of the ticket has increased and sends a portion of the increased price to the issuer of the ticket. In other examples, a fixed retransfer fee can be sent to the ticket issuer for each transfer of the ticket. Other variations are possible without departing from the scope of the disclosed technology.

Figure 4A:
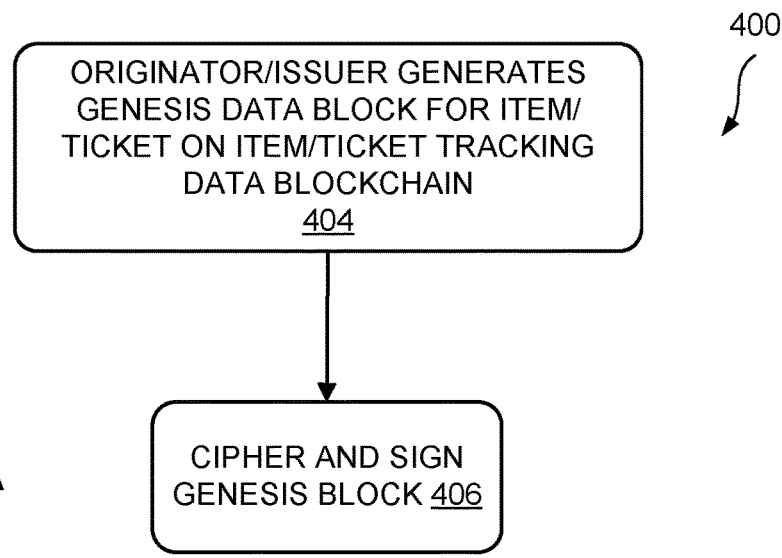
FIG. 4A is a control flow diagram showing an illustrative example of a process for an originator of an item or issuer of a ticket to create a genesis block for a blockchain to track the item or ticket.

FIG. 4A is a control flow diagram showing an illustrative example of a process 400 for creating a genesis block for securely storing provenance data for an item on an item tracking data blockchain in accordance with one aspect of the disclosed technology or representing a ticket on a ticket tracking data blockchain in accordance with another aspect of the disclosed technology.

In the case of an item tracking data blockchain, this example involves creating a genesis block, at 404, for an item that identifies the item and an originator of the item. In some examples, the genesis block may include information identifying a serial number unique to the item, a part number for the item, a manufacturer of the item, a manufacturing date, or descriptive information such as size, color, appearance, etc.

In the case of a ticket tracking data blockchain, the genesis block created at 404 can include information such as an identifier for the ticket, a unique key value for verifying the ticket, a price, a date, a venue, access limitations, seating, etc.

At 406, the genesis block is ciphered and signed to commit the genesis block to the item or ticket tracking data blockchain, such as item or ticket tracking data blockchain 140 in FIG. 1, item tracking data blockchain 240 of FIG. 2B, or ticket tracking data blockchain 260 of FIG. 2C.

Figure 4B:
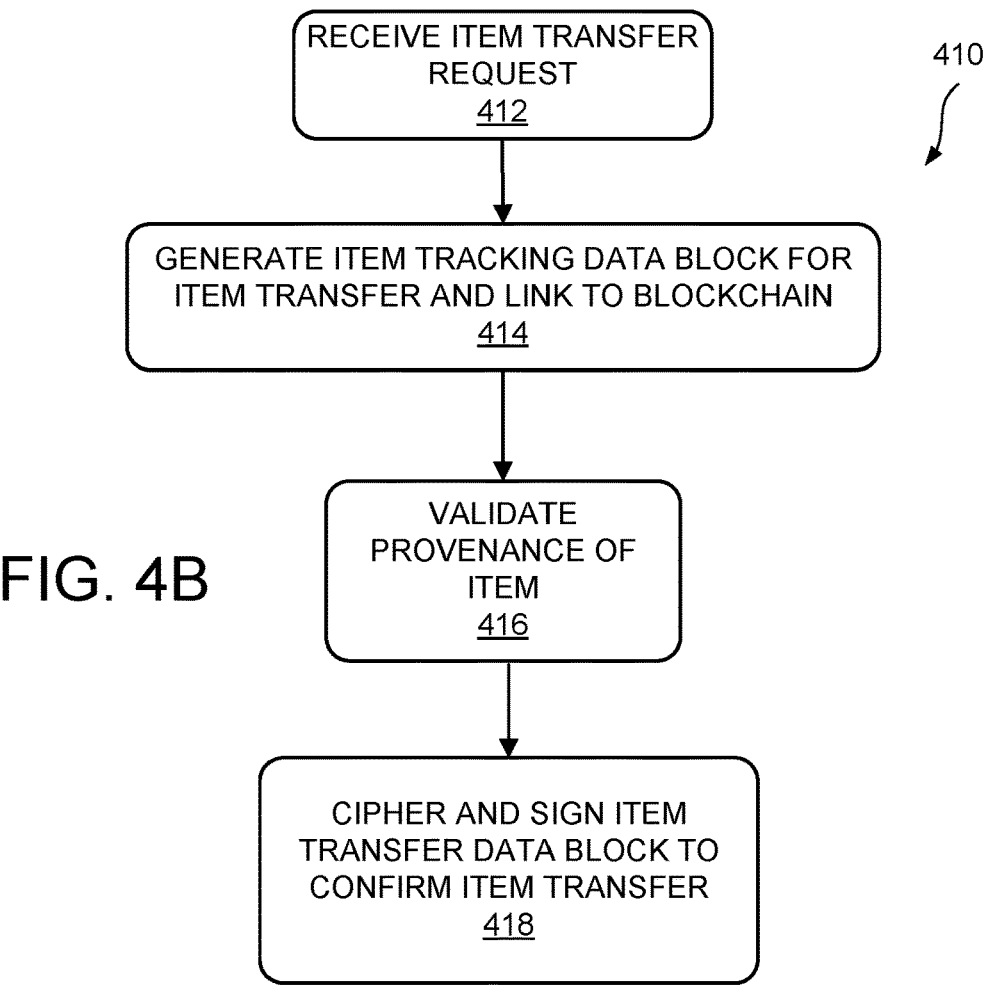
FIG. 4B is a control flow diagram showing an illustrative example of a process for generating an item tracking data block on an item tracking data blockchain for a transfer of an item.

FIG. 4B is a control flow diagram showing an illustrative example of a process 410 for tracking transfer of an item on an item tracking data blockchain. At 412, an item transfer request is received by a blockchain platform supporting the item tracking data blockchain, such as a request to create an item tracking data block from client/server 120A in FIG. 3A.

At 414, an item tracking data block, e.g. item tracking data block 242B in FIG. 3A, is generated for the item transfer and linked to the item tracking data blockchain, i.e. the new item tracking data block is linked to the previous block in the blockchain. The item transfer data block includes an identifier for the transferee of the transaction, e.g. TransfereeA in FIG. 3A.

At 416, in this example, the provenance of the item is validated, such as by a user of the originator device 110 or validation device 112 in FIG. 3A, which sets the validated field in the item tracking data block to TRUE. At 418, the item tracking data block is ciphered and signed to commit the block to the blockchain and confirm the item transfer. For example, the originator using originator device 110 signs item data block 242B in FIG. 3A to confirm the transfer of the item from the originator entity to TransfererA. The blockchain platform then verifies the block as described above.

Figure 4C:
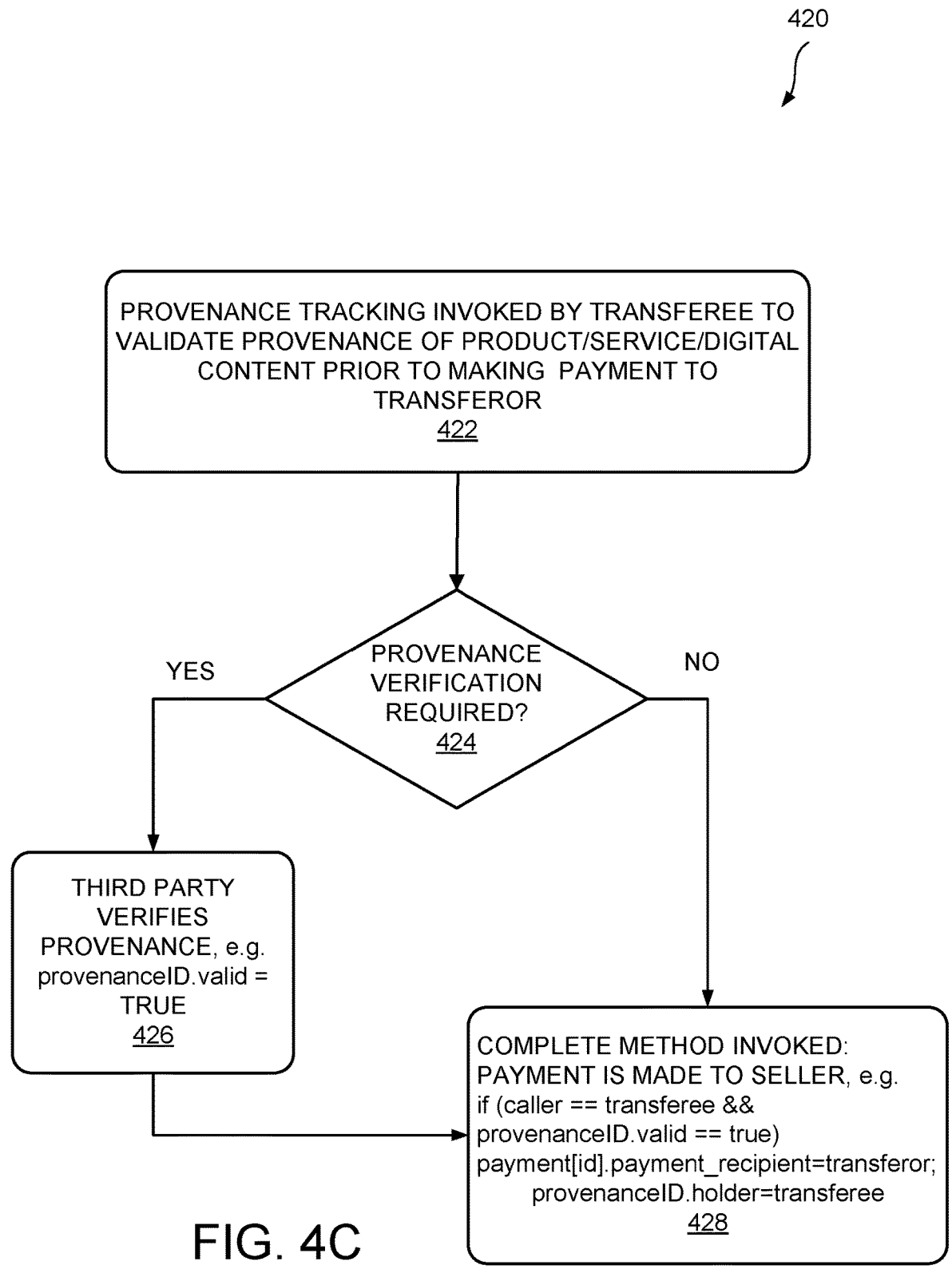
FIG. 4C is a control flow diagram illustrating an example of a process for provenance tracking for a product, service or digital content for a transfer on an item tracking data block.

FIG. 4C is a control flow diagram illustrating an example of a process 420 for validating provenance of an item being transferred, where payment from the transferee to the transferor can be conditioned on successful validation of the item by a third party, such as a certified inspector, appraiser or technician. At 422, a transferee, e.g. TransfereeB in FIG. 3A, invokes provenance tracking to validate the provenance of an item, such as a product, service, or digital content, prior to making payment to the transferor of the item.

In this example, at 424, a check is performed to determine if provenance verification is required for the transfer. For example, a transfer from an originator, such as a manufacturer or authorized distributor, may not require verification of provenance because the item has been in the custody of the originator. If verification is required, control branches at 424 to 426 for a third party to verify provenance of the item. For example, an inspector confirms the provenance of the item and utilizes validation device 112 in FIG. 3A to set the valid field of the item tracking data block to TRUE. At 428, a Complete method in the item tracking data block is invoked to transfer payment to the transferor and set the transferee as the holder in the item tracking data block.

Figure 4D:
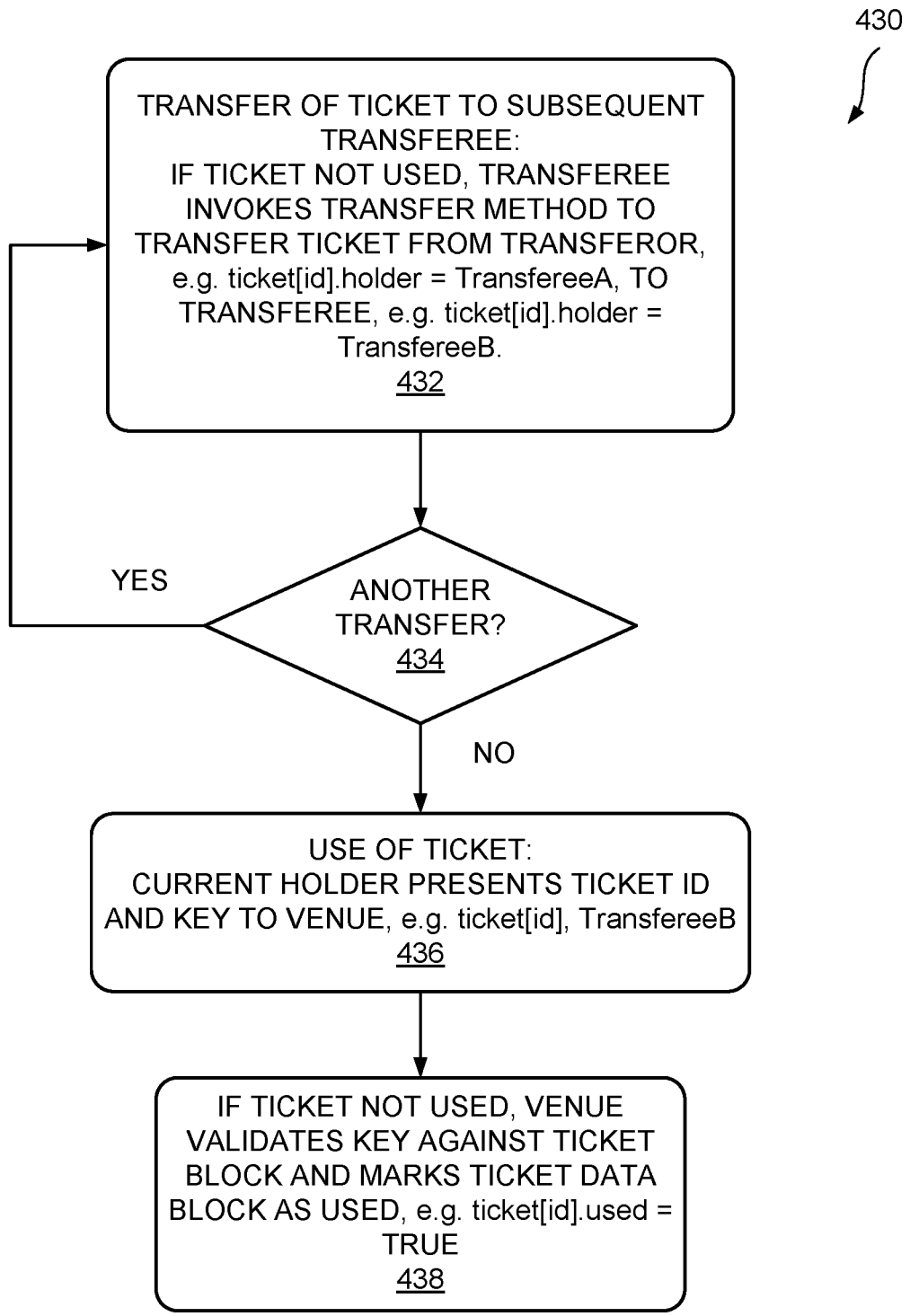
FIG. 4D is a control flow diagram illustrating an example of a process for transferring and using a ticket managed on a ticket tracking data blockchain.

FIG. 4D is a control flow diagram illustrating an example of a process 430 for transferring a ticket on a ticket tracking data blockchain. At 432, if the ticket is not used, e.g. ticket[id].used !=TRUE, a transferee, e.g. TransfereeB in FIG. 3C or 3E, invokes a transfer method defined in a ticket tracking data block to transfer the ticket from the transferor who is the current holder, e.g. ticket[id].holder is TransfereeA, to the subsequent holder, e.g. ticket[id].holder is set to TransfereeB. The transfer process can be repeated for subsequent transfers, at 434.

At 436, a current holder of the ticket presents the ticket at a venue or service provider, e.g. TransfereeB using client/server device 120B presents the ticket to venue device 114 in FIG. 3B. At 438, a Use method defined in the ticket tracking data block is invoked, e.g. by the venue device 114, to check that the ticket is not used, e.g. ticket[id].used=FALSE, validate a ticket code and holder as presented against the latest ticket tracking data block 262 in the ticket tracking data blockchain 260, and, if valid, mark the ticket as used in the ticket tracking data block, e.g. ticket[id].used=TRUE.

Figure 4E:
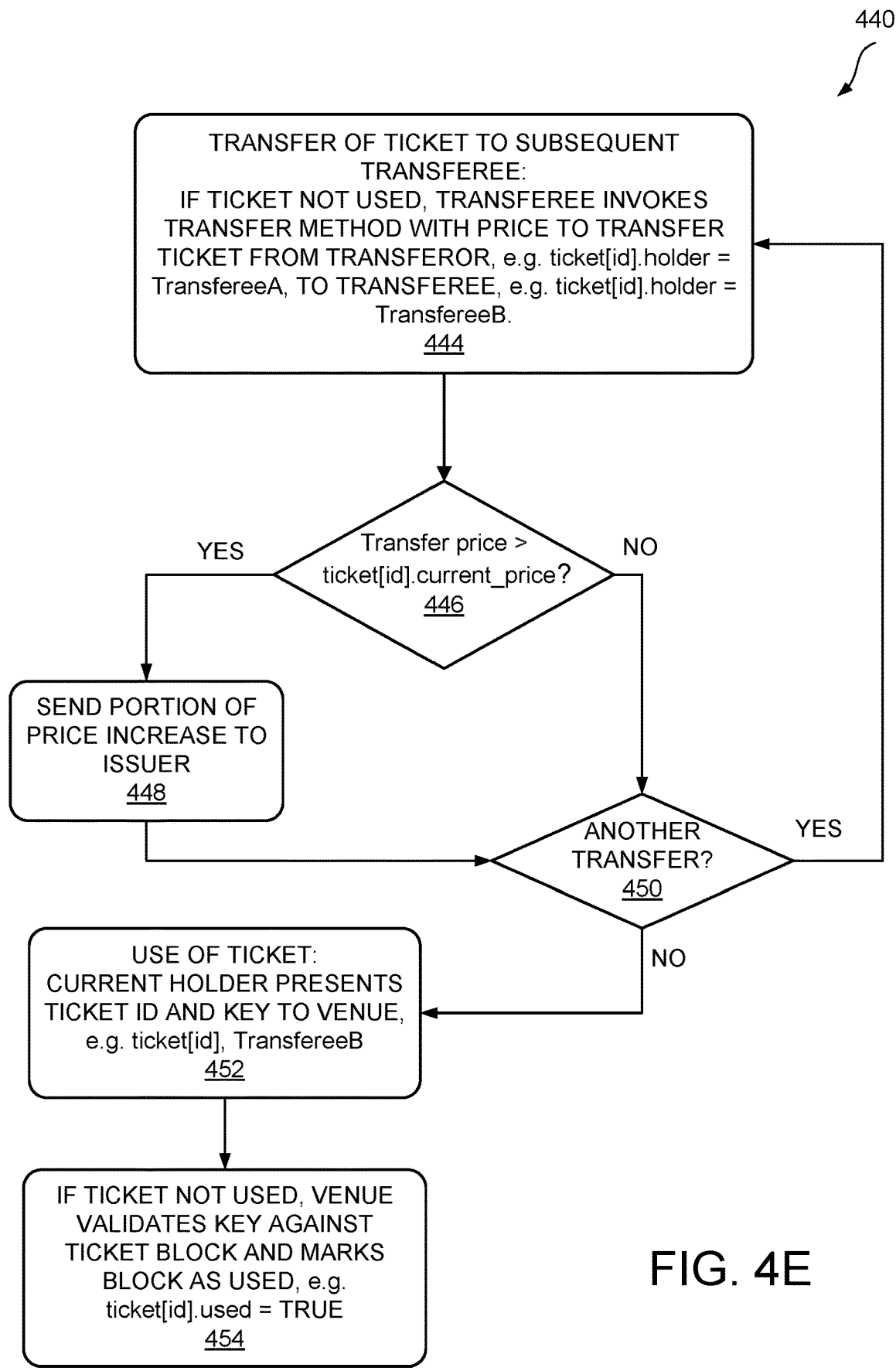
FIG. 4E is a control flow diagram illustrating another example of a process for transferring and using a ticket managed on a ticket tracking data blockchain, where a portion of an increase in ticket price is sent to an issuer of the ticket.

FIG. 4E is a control flow diagram illustrating another example of a process 440 for transferring a ticket on a ticket tracking data blockchain, where a portion of a price increase in the ticket can be transferred to the issuer of the ticket, such as is illustrated in the scenario of FIG. 3E. At 444, if the ticket is not used, a transferee, e.g. TransfereeB in FIG. 3E, invokes a transfer method defined in a ticket tracking data block to transfer the ticket from the transferor who is the current holder, e.g. ticket[id].holder is TransfereeA, to the subsequent holder, e.g. ticket[id].holder is set to TransfereeB, at a transfer price.

At 446, if the transfer price is greater than the current_price in the ticket tracking data block, then control branches to 448, where a portion of the price increase can be sent to the issuer of the ticket. Alternatively, a fixed transfer fee may be sent to the issuer when the ticket is transferred. The transfer process can be repeated for subsequent transfers, at 450. At 452, a current holder of the ticket presents the ticket at a venue or service provider, e.g. TransfereeB using client/server device 120B presents the ticket to venue device 114 in FIG. 3E. At 454, a Use method defined in the ticket tracking data block is invoked, e.g. by the venue device 114, to check that the ticket is not used, e.g. ticket[id].used=FALSE, validate a ticket code and holder as presented against the latest ticket tracking data block 262 in the ticket tracking data blockchain 260, and, if valid, mark the ticket as used in the ticket tracking data block, e.g. ticket[id].used=TRUE.

Figure 4F:
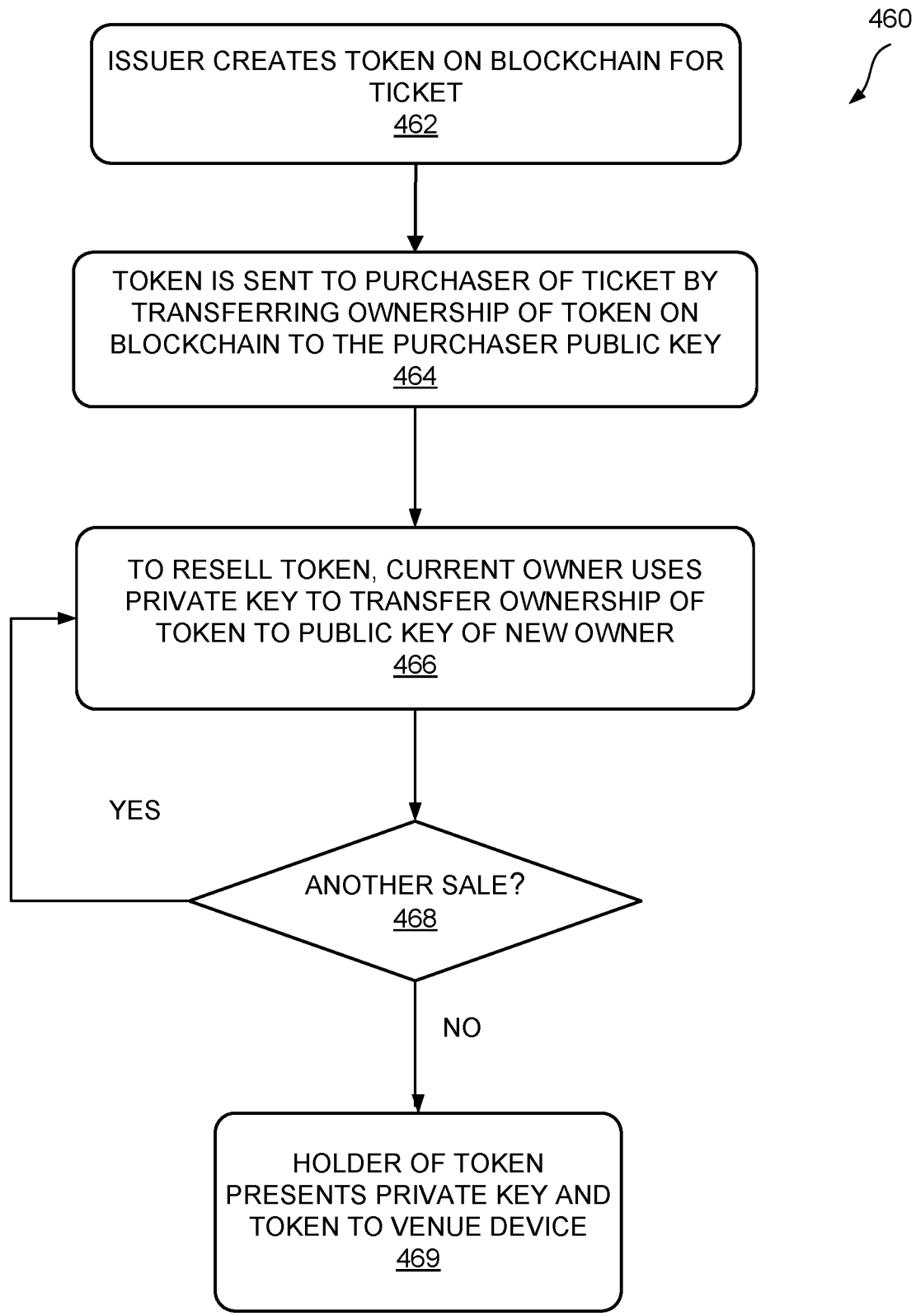
FIG. 4F is a control flow diagram illustrating still another example of a process for transferring and using a ticket managed on a ticket tracking data blockchain, where an issuer of the ticket creates a token on a blockchain for the ticket.

FIG. 4F is a control flow diagram illustrating still another example of a process 460 for transferring and using a ticket managed on a ticket tracking data blockchain, where an issuer of the ticket creates a token on a blockchain for the ticket. In this example, at 462, an issuer creates a token for the ticket on a ticket tracking data blockchain. At 464, the token is sent to a purchaser of the ticket by transferring ownership of the token to the purchaser on the ticket tracking data blockchain, e.g. by adding a ticket tracking data block with the purchaser indicated as the owner or holder.

To resell the token, at 466, the current owner or holder use a private key to transfer ownership of the token on the ticket tracking data blockchain to a public key address of the new owner. At 468, sale of the ticket can be repeated with each current owner using their private key to transfer the token to the public key address of the new owner on the ticket tracking data blockchain. At 469, the current owner or holder of the ticket presents their private key and the token to a venue device, which verifies that the ticket is valid and marks it as used.

Access to the provenance data maintained on the item tracking data blockchain or the ticket maintained on the ticket tracking data blockchain may be handled in a variety of ways. For increased transparency and availability, the blockchain can be initiated on a public blockchain with the provenance or ticket data being available to any person who can access the blockchain. Or the item or ticket tracking data blockchain can be configured to encrypt the provenance or ticket data and access to the provenance or ticket data controlled, such as my including an authorized access list or requiring a key obtained from the originator or issuer. For example, access can be limited to entities identified in a list included in the item tracking data blockchain. In another example, the originator or issuer distributes a key to entities in order to decrypt the provenance or ticket data.

Depending upon the scripting capabilities of the blockchain platform, the data blocks of the item or ticket tracking data blockchain may include more extensive code execution. For example, an item tracking system based on an item tracking data blockchain that encrypts the provenance data and controls access to the provenance may require more extensive code execution capability in the blockchain than an item tracking system that makes the provenance data publicly available in an unencrypted state.

It should be appreciated that the utilization of blockchain technology, such as scripting technology within smart contracts, in this context provides a high degree of flexibility and variation in the configuration of implementations without departing from the teachings of the present disclosure.

Note that the disclosed technology may be applied to tracking and transferring a variety of types of real and virtual property. The technology may be applied to secure transfer of physical objects, securities, services, or digital content.

Figure 5:
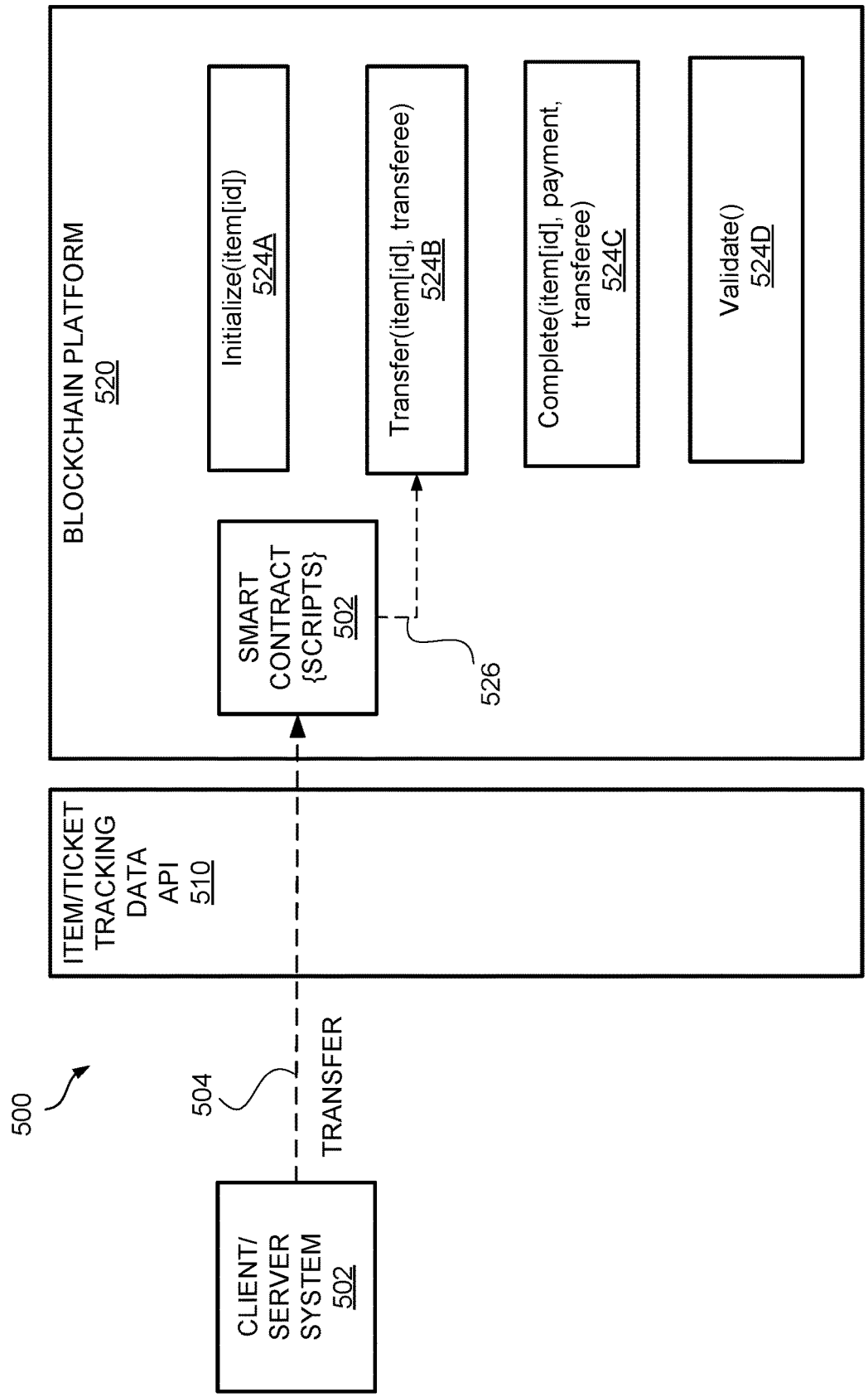
FIG. 5 is a data architecture diagram showing an illustrative example of a user using an application programming interface to transfer and track items on an item tracking data blockchain.

FIG. 5 is a data architecture diagram showing an illustrative example of an interface for accessing an item or ticket tracking data blockchain, such as blockchain 140 in FIG. 1, blockchain 200 in FIG. 2A, blockchain 240 in FIG. 2B, blockchain 260 in FIG. 2C, blockchain 240 in FIG. 3A, or blockchain 260 in FIG. 3C. In this example, an evaluation Application Program Interface (API) 510 provides an interface to the blockchain platform 520 that supports the item or ticket tracking data blockchain. The blockchain platform 520 supports a smart contract 522, such as item tracking data block 242 in FIG. 3B or 262 in FIG. 3C, which includes scripts 524 with code that, when executed by the blockchain platform 520, performs operations with respect to the item tracking data blockchain.

In the example of FIG. 5, four scripts are defined in smart contract 522. The Initialize script 524A provides a capability for an entity to initialize tracking an item on an item tracking data blockchain, such as providing for an originator or issuer to establish a genesis block with provenance information for an item or a unique identifier or key for a ticket. The Transfer script 524B provides a capability for transferring the item or ticket from a transferor or transferee.

The Complete script 524C, or, alternatively, a Use script for a ticket, provides the capability for a transferee to complete transfer of an item on the blockchain and transfer payment to the transferor. In this example, the Complete script calls a Validate script 524D to obtain validation of the provenance of the item from a third party, such as a validation entity. In a ticket context, a Use script can provide a capability for a venue device to verify the authenticity of a ticket upon presentation and mark the ticket as used.

The Transfer script 524D provides the capability for an entity to generate an item or ticket tracking data block to transfer an item or ticket. For example, as discussed above with respect to the item tracking data blockchain of FIGS. 3A and 3B, the Transfer script can be called by a transferee to create a new item tracking data block for transferring an item from a transferor and link the new block to the blockchain. The transferor can confirm the transfer by ciphering and signing data in the new block.

The scripts 524 shown are merely examples and many other different or additional scripts can be defined using the capability of the executable scripts in smart contract 522 as provided for on blockchain platform 520.

FIG. 5 shows a transferee's client/server system 502 submitting a Transfer request 504 to API 510. API 510 invokes smart contract 522 causing blockchain platform 520 to execute the Transfer script 524B to generate a new item tracking data block on the item tracking data blockchain with the transferee as the new holder of the item. Once payment is confirmed by the transferor, the transferor signs the new block to commit the new block to the blockchain.

Blockchain Ledger Data Structure

Figure 6A:
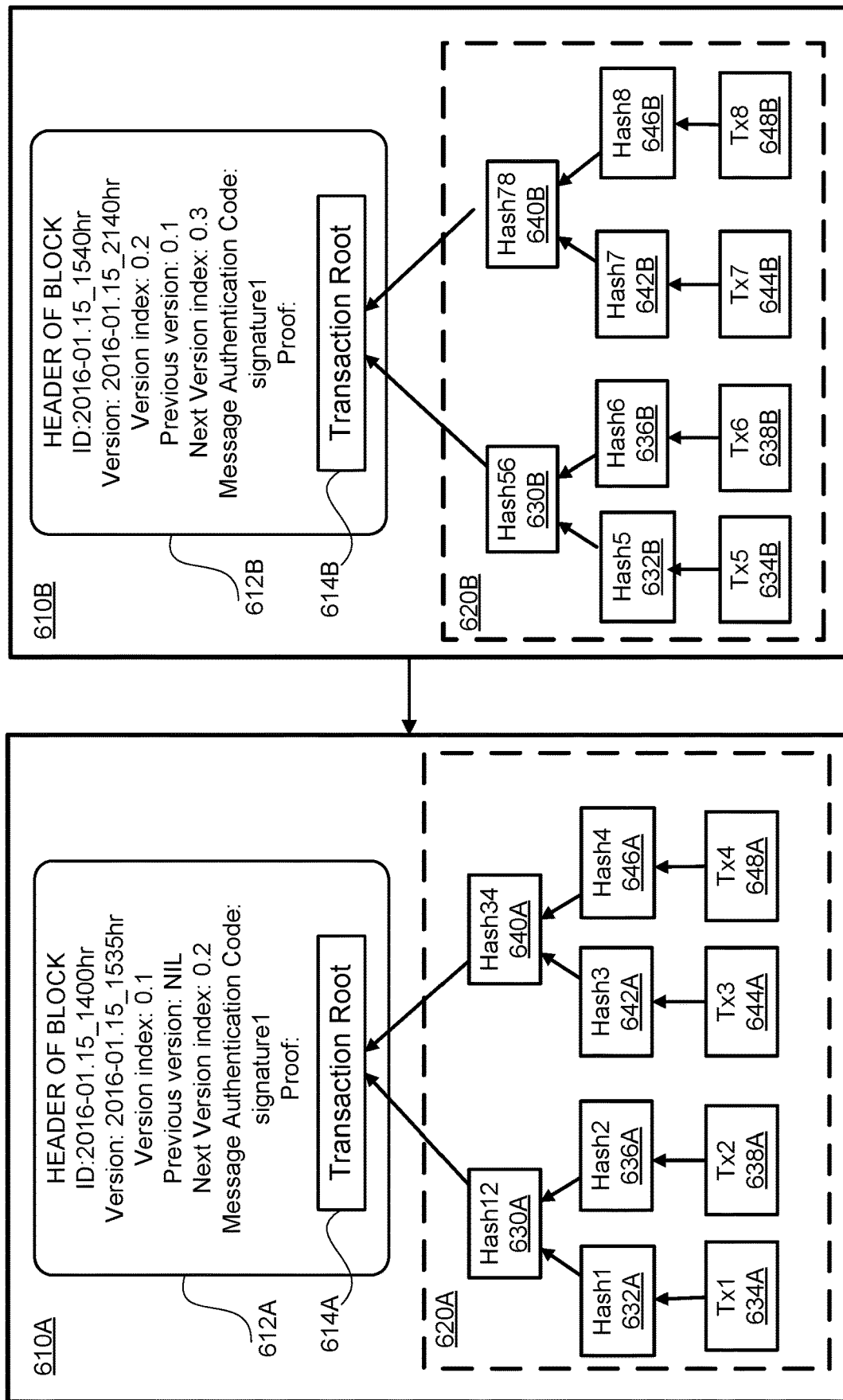
FIG. 6A is a data architecture diagram illustrating a simplified example of a blockchain ledger based on the tracking data blocks of the item tracking data blockchain of FIG. 1.

FIG. 6A is a data architecture diagram illustrating a simplified example of a blockchain ledger 600 based on the blocks 142A-E of the item tracking data blockchain 140 of FIG. 1. The blockchain ledger 600 example of FIG. 6A is simplified to show block headers, metadata and signatures of blocks 210A-E in order to demonstrate a secure item or ticket ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
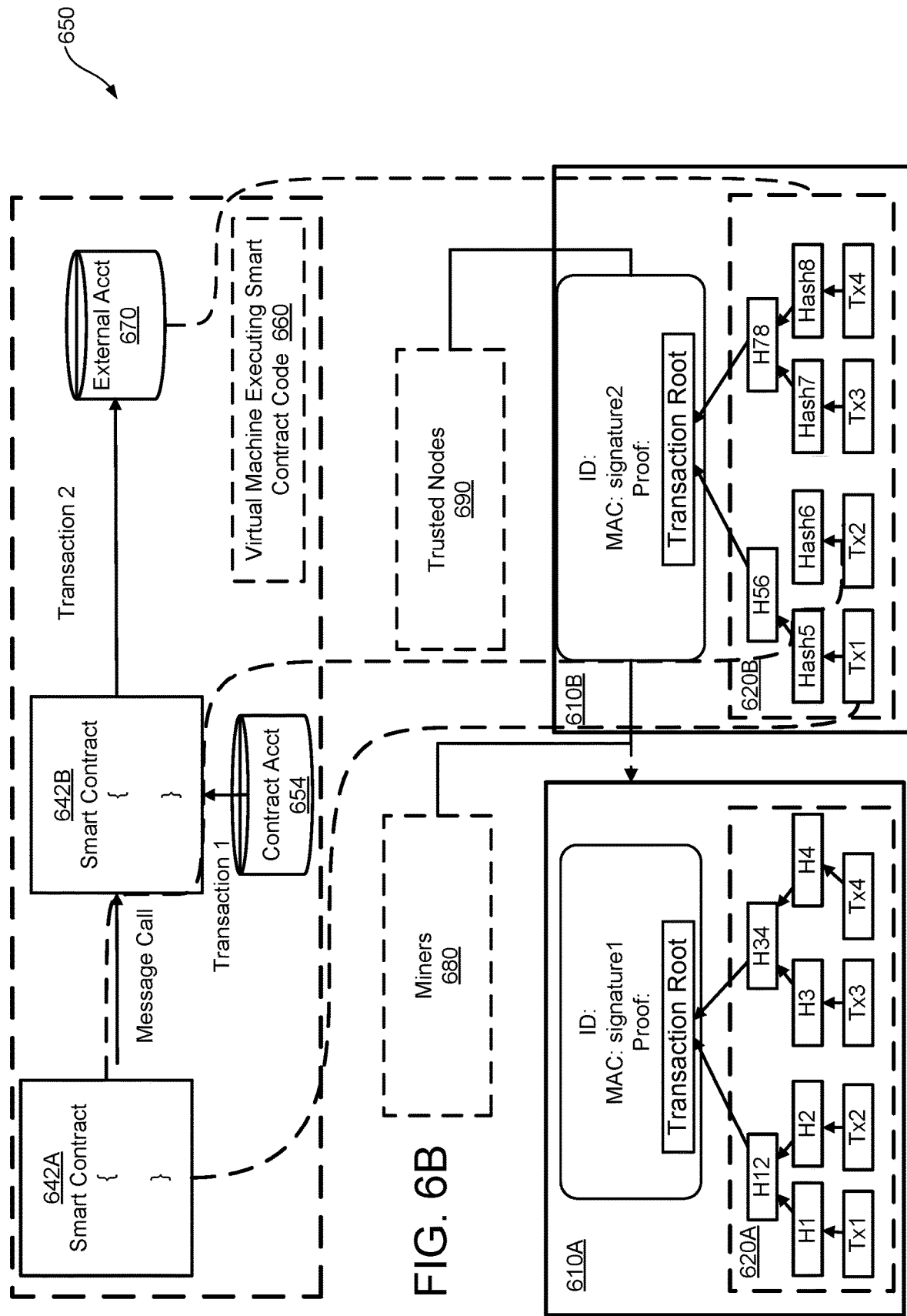
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as item originator or ticket issuer device 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a tracking data block 142 for item tracking data blockchain 140, the block is an unconfirmed and unidentified entity. To be part of the acknowledged "currency", it may be added to the blockchain, and therefore relates to the concept of a trusted cluster.

In a trusted cluster, when a tracking data block 142 is added, every node competes to acknowledge the next "transaction" (e.g. a transfer of an item or ticket). In one example, the nodes compete to mine and get the lowest hash value: min {previous_hash, contents_hash, random_nonce_to_be_guessed}-> result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

Figure 4G:
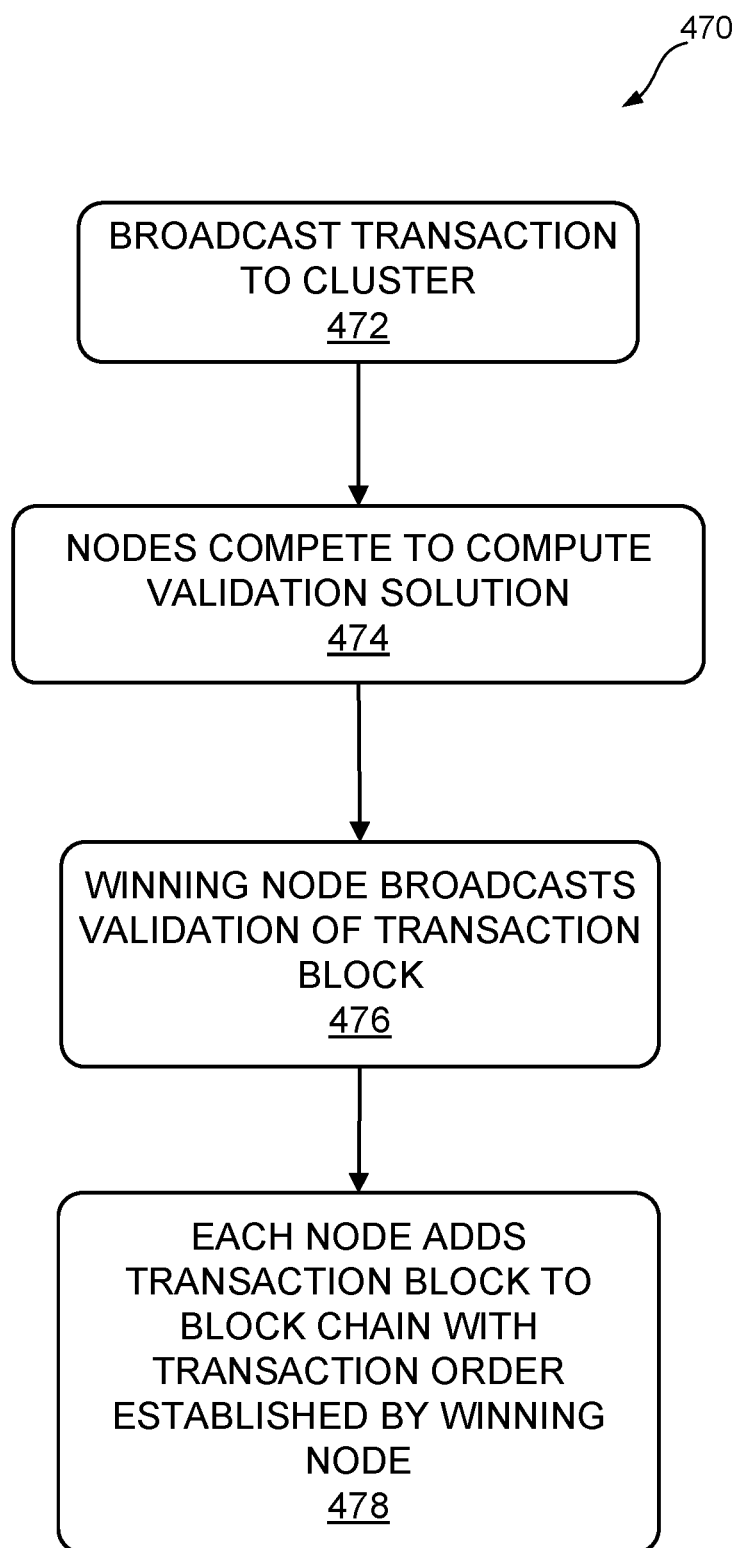
FIG. 4G is a control flow diagram illustrating an example of a validation process for blocks added to the item or ticket tracking data blockchains distributed to untrusted nodes.

The mining process, such as may be used in concert with the validation process 470 of FIG. 4G, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast to the network, at 472, using software. Mining nodes compete, at 474, to compute a validation solution to validate transactions, and then broadcast, at 476, the completed block validation to other nodes. Each node adds the block, at 478, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the item or ticket tracking data blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a distributed item or ticket tracking data blockchain may be restricted by cryptographic means to be only open to authorized servers. Since the item or ticket tracking data blockchain ledger is distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving an item tracking data blockchain ledger. The specific examples of different aspects of an item tracking data blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
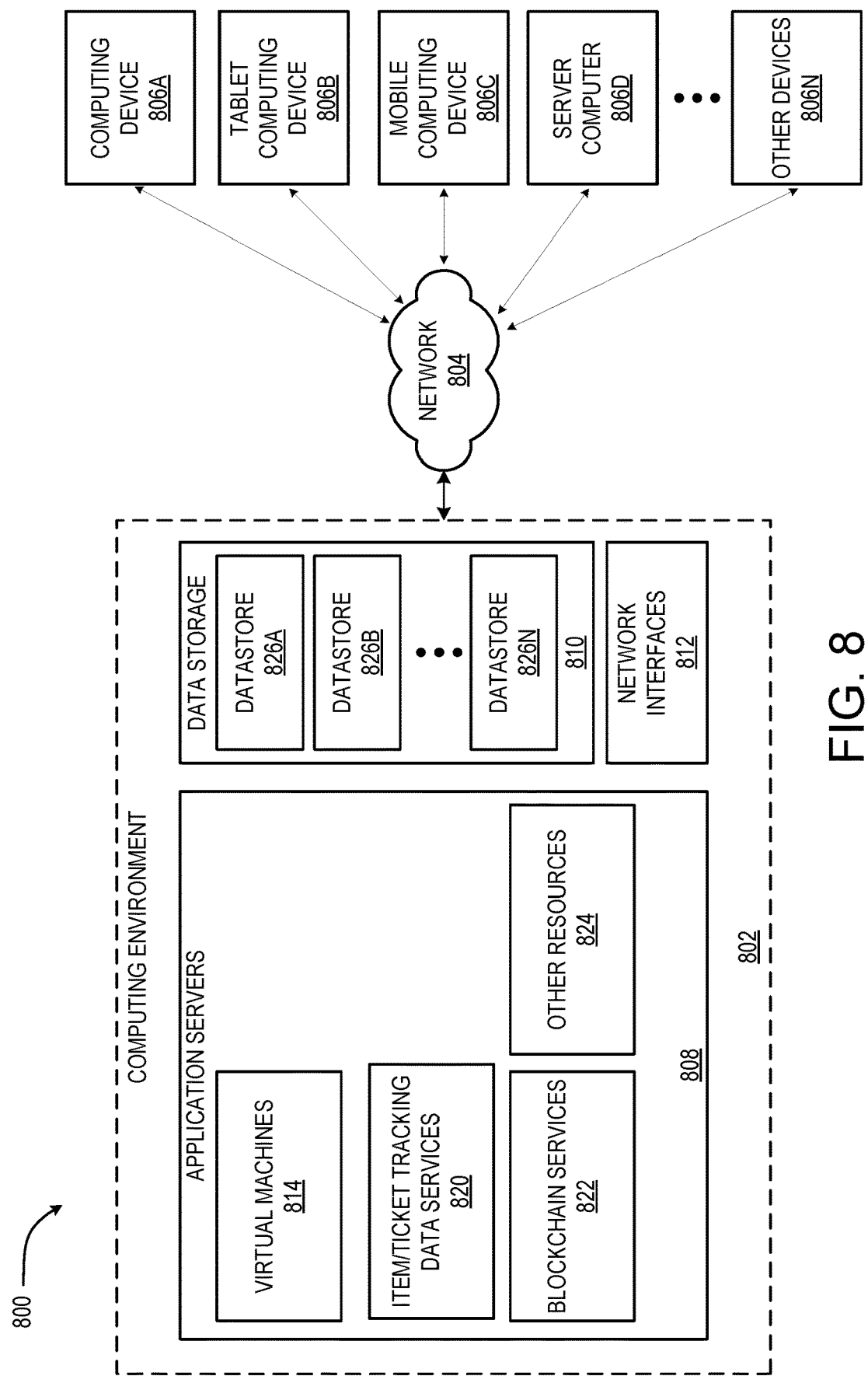
FIG. 8 is a diagram illustrating a distributed computing environment capable of implementing aspects of the techniques and technologies presented herein.

Note that at least parts of processes 400, 410, 420, 430, 440, 460 and 470 of FIGS. 4A, 4B, 4C, 4D, 4E, 4F and 4G, the scripts of item tracking data block 242 of FIG. 3B, item tracking data block 262 of FIG. 3D, smart contract 522 of FIG. 5, smart contracts 642 of FIG. 6B, and other processes and operations pertaining to an item tracking data blockchain ledger described herein may be implemented in one or more servers, such as computer environment 800 in FIG. 8, or the cloud, and data defining the results of user control input signals translated or interpreted as discussed herein may be communicated to a user device for display. Alternatively, the item or ticket tracking data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, 420, 430, 440, 460 and 470 of FIGS. 4A, 4B, 4C, 4D, 4E, 4F and 4G, the scripts of item tracking data block 242 of FIG. 3B, item tracking data block 262 of FIG. 3D, smart contract 522 of FIG. 5, smart contracts 642 of FIG. 6B) are described herein as being implemented, at least in part, by an application, component, and/or circuit. Although the following illustration refers to the components of FIGS. 1, 3B, 3D, 4A, 4B, 4C, 4D, 4E, 4F, 4G, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, 420, 430, 440, 460 and 470 of FIGS. 4A, 4B, 4C, 4D, 4E, 4F and 4G, the scripts of item tracking data block 242 of FIG. 3B, item tracking data block 262 of FIG. 3D, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
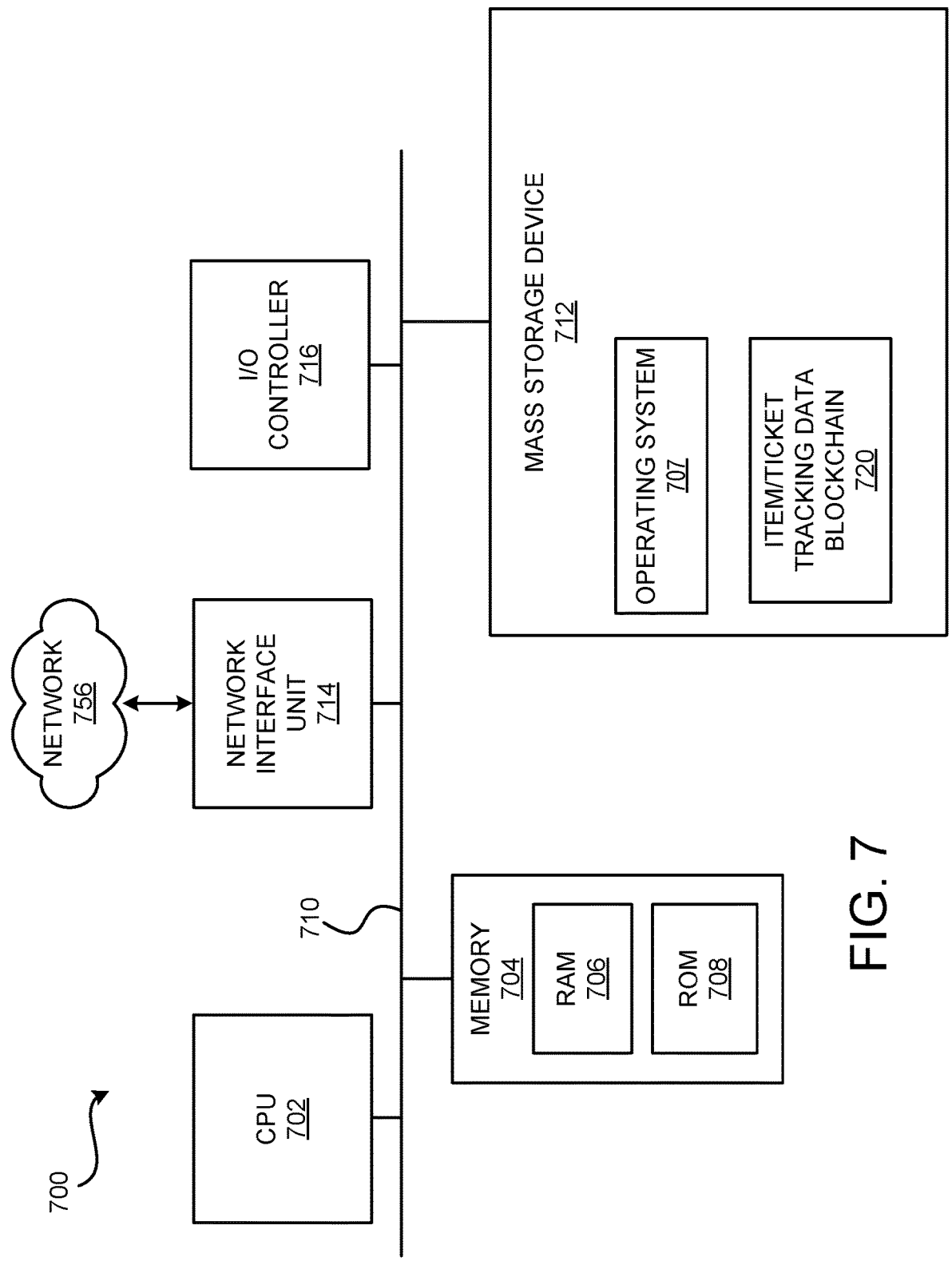
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of item tracking data blockchain data 720), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for an item tracking data blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

According to various implementations, the application servers 808 also include one or more data file management services 820 and one or more blockchain services 822. The data file management services 820 can include services for managing a data file on an item tracking data blockchain, such as item tracking data blockchain 140 in FIG. 1. The blockchain services 822 can include services for participating in management of one or more blockchains, such as by creating genesis blocks, tracking data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for an item tracking data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting an item tracking data blockchain ledger, among other aspects.

Figure 9:
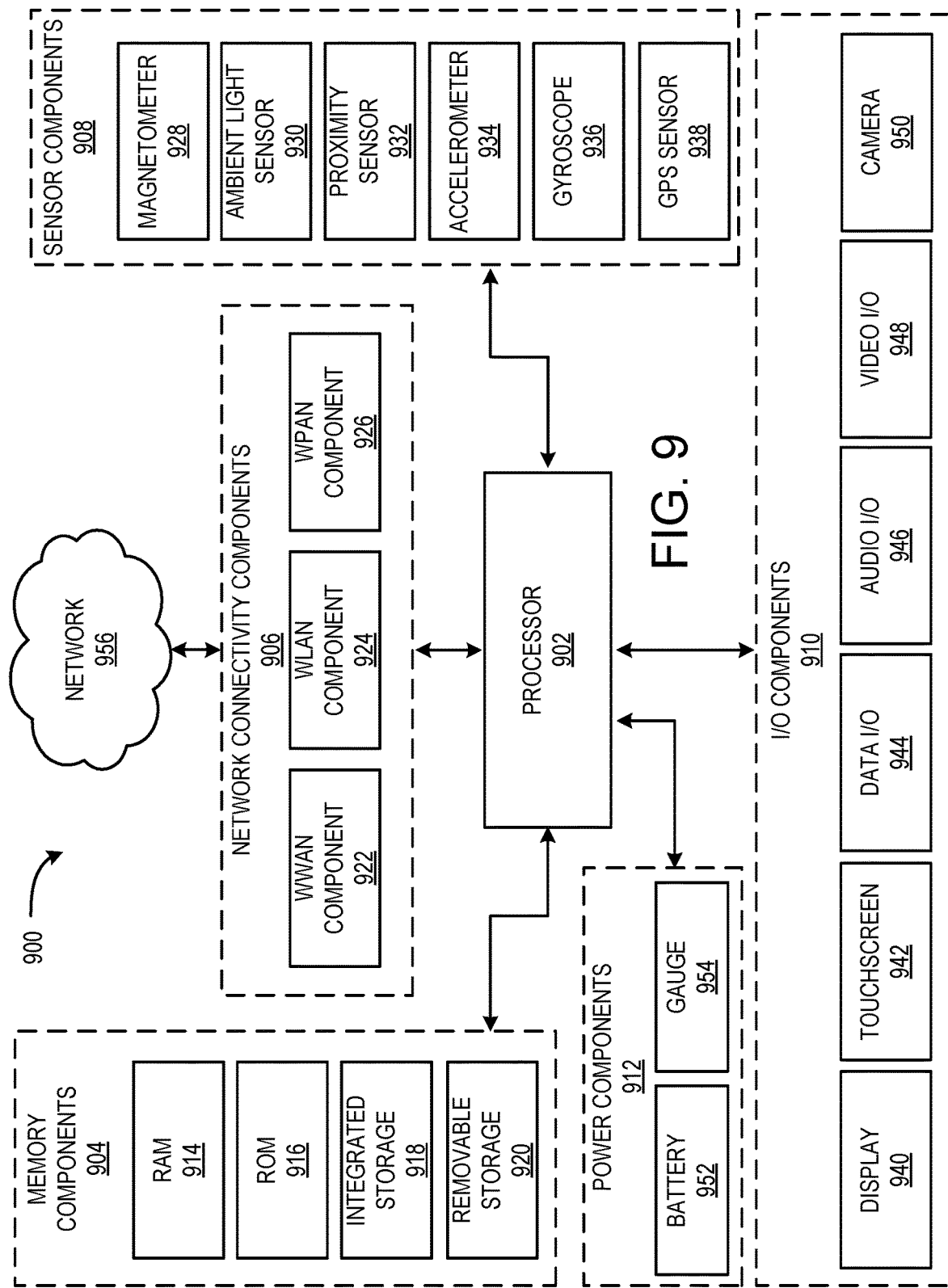
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for an item tracking data blockchain ledger. The computing device architecture 900 is applicable to computing devices that can manage an item tracking data blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the item originator or ticket issuer device 110, validation device 112, venue device 114, and client/servers 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

The present disclosure is made in light of the following clauses:

Clause 1: A computer-implemented item provenance tracking method, the method comprising: generating, by an originator entity, a first item tracking data block on an item tracking data blockchain, the first item tracking data block storing data identifying an item, a holder identifier for identifying a holder of the item and a validated indicator, where holder identifier is set to an identifier of the originator entity for the item and the validated indicator is set to a true state; signing data in the first item tracking data block with a first cryptographic digital signature of the originator entity; generating, by a first transferee entity, a second item tracking data block on the item tracking data blockchain, the second item tracking data block storing a holder identifier and a validated indicator, where the holder identifier is set to an identifier of the first transferee entity and the validated indicator is set to the true state; linking the second item tracking data block to the first item tracking data block; and signing data in the second item tracking data block with a second cryptographic digital signature of the originator entity.

Clause 2: The computer-implemented method of Clause 1, where the method includes: generating, by a second transferee entity, a third item tracking data block on the item tracking data blockchain, the third item tracking data block storing a holder identifier and a validated indicator, where the holder identifier is set to an identifier of the second transferee entity and the validated indicator is set to the false state; linking the third item tracking data block to the second item tracking data block; responsive to receiving a verification message from a third party, setting the validated indicator in the third item tracking block to true; and signing data in the third item tracking data block with a cryptographic digital signature of the first transferee entity.

Clause 3: The computer-implemented method of Clause 2, where: the identifier of the originator entity comprises a public key address for the originator entity; the identifier of the first transferee entity comprises a public key address for the first transferee entity; the identifier of the second transferee entity comprises a public key address for the second transferee entity: the first cryptographic digital signature of the originator entity is partially based on data within the first item tracking data block; the second cryptographic digital signature of the originator entity is partially based on data within the second item tracking data block; and the cryptographic digital signature of the first transferee entity is partially based on data within the third item tracking data block.

Clause 4: The computer-implemented method of Clause 2, where the step of responsive to receiving a verification message from a validation party, setting the validated indicator in the third item tracking block to true includes, responsive to receiving the verification message from the validation party, transferring payment for the item to the first transferee.

Clause 5: The computer-implemented method of Clause 2, where the validation party comprises one of the originator entity, an entity authorized by the originator entity, and a certified entity.

Clause 6: The computer-implemented method of Clause 2, where: the item further comprises a ticket; and the step of generating, by an originator entity, a first item tracking data block on an item tracking data blockchain includes: generating a unique code value for the ticket, storing the unique code value for the ticket in the first item tracking data block, and storing a used indicator in the first item tracking data block, where the used indicator is set to the false state.

Clause 7: The computer-implemented method of Clause 4, the method further comprising: receiving from the second transferee entity a presented code value; and if the used indicator stored in the third ticket tracking data block is set to the false state and the presented code value corresponds to the unique code value stored in the third ticket tracking data block, indicating the ticket as valid and setting the used indicator to the true state.

8. A computer-implemented ticket tracking method, the method comprising:

generating, by an issuer entity, a first ticket tracking data block on a ticket tracking data blockchain, the first ticket tracking data block storing a unique code value for the ticket, a holder identifier for identifying a holder of the ticket and a used indicator, where holder identifier is set to an identifier of the issuer entity for the ticket and the used indicator is set to a false state;

signing data in the first ticket tracking data block with a first cryptographic digital signature of the issuer entity;

generating, by a first transferee entity, a second ticket tracking data block on the ticket tracking data blockchain, the second ticket tracking data block storing a holder identifier, the unique code value for the ticket, and a used indicator, where the holder identifier is set to an identifier of the first transferee entity and the used indicator is set to the false state;

linking the second ticket tracking data block to the first ticket tracking data block; and signing data in the second ticket tracking data block with a second cryptographic digital signature of the issuer entity.

Clause 9: The computer-implemented method of Clause 8, where the method includes: if the used indicator is set to the false state, generating, by a second transferee entity, a third ticket tracking data block on the ticket tracking data blockchain, the third ticket tracking data block storing a holder identifier, the unique code value for the ticket, and a used indicator, where the holder identifier is set to an identifier of the second transferee entity and the used indicator is set to the false state; linking the third ticket tracking data block to the second ticket tracking data block; and signing data in the third ticket tracking data block with a cryptographic digital signature of the first transferee entity.

Clause 10. The computer-implemented method of Clause 9, the method further comprising: receiving from the second transferee entity a presented code value; and if the used indicator stored in the third ticket tracking data block is set to the false state and the presented code value corresponds to the unique code value stored in the third ticket tracking data block, indicating the ticket as valid and setting the used indicator to the true state.

Clause 11. The computer-implemented method of Clause 9, where:

the second ticket tracking data block stores a price value and the price value is set to a first transfer price for the transfer from the issuer entity to the first transferee entity; and the step of generating, by a second transferee entity, a third ticket tracking data block on the ticket tracking data blockchain includes determining whether a second transfer price for the transfer from the first transferee entity to the second transferee entity is greater than the first transfer price, and if the second transfer price is greater than the first transfer price, send a payment from the first transferee to the issuer entity.

Clause 12. The computer-implemented method of Clause 11, where an amount of the payment from the first transferee to the issuer entity comprises at least one of a predetermined amount, an amount based on the second transfer price, and an amount based on a difference between the first and second transfer prices.

Clause 13. The computer-implemented method of Clause 9, where:

the identifier of the issuer entity comprises a public key address for the issuer entity; the identifier of the first transferee entity comprises a public key address for the first transferee entity; the identifier of the second transferee entity comprises a public key address for the second transferee entity: the first cryptographic digital signature of the issuer entity is partially based on data within the first ticket tracking data block; the second cryptographic digital signature of the issuer entity is partially based on data within the second ticket tracking data block; and the cryptographic digital signature of the first transferee entity is partially based on data within the third ticket tracking data block.

Clause 14. The computer-implemented method of Clause 9, where: the step of signing data in the second ticket tracking data block with a second cryptographic digital signature of the issuer entity is performed in response to confirmation of payment from the first transferee entity to the issuer entity; and the step of signing data in the third ticket tracking data block with a cryptographic digital signature of the first transferee entity is performed in response to confirmation of payment from the second transferee entity to the first transferee entity.

Clause 15. A system for tracking a ticket on a ticket tracking data blockchain, where the ticket tracking data blockchain stores a unique code value for the ticket, a holder identifier for identifying a holder of the ticket and a used indicator indicating whether the ticket has been used, the system comprising: one or more processors; and one or more memory devices in communication with the one or more processors, the memory devices having computer-readable instructions stored thereupon that, when executed by the processors, cause the processors to: responsive to a first transfer request, if the used indicator indicates that the ticket has not been used, generate, by a first transferee entity, a first ticket tracking data block on a ticket tracking data blockchain, the first ticket tracking data block storing an identifier of the first transferee entity in a holder identifier of the first ticket tracking data block; link the first ticket tracking data block to a previous ticket tracking data block on the ticket tracking data blockchain; and sign data in the first ticket tracking data block with a cryptographic digital signature of a transferor entity identified in the holder identifier stored in the previous ticket tracking data block.

Clause 16. The system of Clause 15, where the memory device includes computer-readable instructions stored thereupon that, when executed by the processors, cause the processors to: responsive to a second transfer request, if the used indicator indicates that the ticket has not been used, generate, by a second transferee entity, a second ticket tracking data block on the ticket tracking data blockchain, the second identifier ticket tracking data block storing an identifier of the second transferee entity in the holder identifier; link the second ticket tracking data block to a first ticket tracking data block on the ticket tracking data blockchain; and sign data in the second ticket tracking data block with a cryptographic digital signature of the first transferee entity identified in the holder identifier stored in the first ticket tracking data block.

Clause 17. The system of Clause 16, where the memory device includes computer-readable instructions stored thereupon that, when executed by the processors, cause the processors to: receive a presented holder identifier and a presented code value; and if the used indicator indicates that the ticket has not been used, the presented holder identifier corresponds to the holder identifier in the a most recent ticket tracking data block in the ticket tracking data blockchain, and the presented code value corresponds to the unique code value stored in the ticket tracking data blockchain, indicate the ticket as valid and set the used indicator in the ticket tracking data blockchain to indicate that the ticket has been used.

Clause 18. The system of Clause 16, where the first ticket tracking data block stores a first transfer price value corresponding to the first transfer and the memory device includes computer-readable instructions stored thereupon that, when executed by the processors, cause the processors to: in the step of generating, by a second transferee entity, a second ticket tracking data block on the ticket tracking data blockchain, determine whether a second transfer price value for the transfer from the first transferee entity to the second transferee entity is greater than the first transfer price value, and if the second transfer price value is greater than the first transfer price value, send a payment from the first transferee to an issuer entity.

Clause 19. The system of Clause 18, where an amount of the payment from the first transferee to the issuer entity comprises at least one of a predetermined amount, an amount based on the second transfer price, and an amount based on a difference between the first and second transfer prices.

Clause 20. The system of Clause 16, where the memory device includes computer-readable instructions stored thereupon that, when executed by the processors, cause the processors to: perform the operation to sign data in the first ticket tracking data block with a cryptographic digital signature of a transferor entity identified in the holder identifier stored in the previous ticket tracking data block in response to confirmation of payment from the first transferee entity to the transferor entity; and perform the operation to sign data in the second ticket tracking data block with a cryptographic digital signature of the first transferee entity identified in the holder identifier stored in the first ticket tracking data block in response to confirmation of payment from the second transferee entity to the first transferee entity.

What is claimed is:

1. A computer-implemented item provenance tracking method, the method comprising:

generating, by an originator entity, a first item tracking data block on an item tracking data blockchain, the first item tracking data block storing data identifying an item, a holder identifier for identifying a holder of the item and a validated indicator, where holder identifier is set to an identifier of the originator entity for the item and the validated indicator is set to a true state;

signing data in the first item tracking data block with a first cryptographic digital signature of the originator entity;

generating, by a first transferee entity, a second item tracking data block on the item tracking data blockchain, the second item tracking data block storing a holder identifier and a validated indicator, where the holder identifier is set to an identifier of the first transferee entity and the validated indicator is set to the true state;

linking the second item tracking data block to the first item tracking data block; and signing data in the second item tracking data block with a second cryptographic digital signature of the originator entity;

generating, by a second transferee entity, a third item tracking data block on the item tracking data blockchain, the third item tracking data block storing a holder identifier and a validated indicator, where the holder identifier is set to an identifier of the second transferee entity and the validated indicator is set to the false state;

linking the third item tracking data block to the second item tracking data block;

responsive to receiving a verification message from a third party, setting the validated indicator in the third item tracking block to true; and signing data in the third item tracking data block with a cryptographic digital signature of the first transferee entity.

2. The computer-implemented method of claim 1, where:
the identifier of the originator entity comprises a public key address for the originator entity;
the identifier of the first transferee entity comprises a public key address for the first transferee entity;
the identifier of the second transferee entity comprises a public key address for the second transferee entity:
the first cryptographic digital signature of the originator entity is partially based on data within the first item tracking data block;
the second cryptographic digital signature of the originator entity is partially based on data within the second item tracking data block; and
the cryptographic digital signature of the first transferee entity is partially based on data within the third item tracking data block.

3. The computer-implemented method of claim 1, where the step of responsive to receiving a verification message from a validation party, setting the validated indicator in the third item tracking block to true includes, responsive to receiving the verification message from the validation party, transferring payment for the item to the first transferee.

4. The computer-implemented method of claim 1, where the validation party comprises one of the originator entity, an entity authorized by the originator entity, and a certified entity.

5. Non-transitory computer storage media having computer executable instructions stored thereon which, when executed by a plurality of processors, cause the processors to execute an item provenance tracking method, the method comprising:

generating, by a first processor associated with an originator entity, a first item tracking data block on an item tracking data blockchain, the first item tracking data block storing data identifying an item, a holder identifier for identifying a holder of the item and a validated indicator, where holder identifier is set to an identifier of the originator entity for the item and the validated indicator is set to a true state;

signing data in the first item tracking data block with a first cryptographic digital signature of the originator entity;

generating, by a second processor associated with a first transferee entity, a second item tracking data block on the item tracking data blockchain, the second item tracking data block storing a holder identifier and a validated indicator, where the holder identifier is set to an identifier of the first transferee entity and the validated indicator is set to the true state;

linking the second item tracking data block to the first item tracking data block; and signing data in the second item tracking data block with a second cryptographic digital signature of the originator entity;

generating, by a third processor associated with a second transferee entity, a third item tracking data block on the item tracking data blockchain, the third item tracking data block storing a holder identifier and a validated indicator, where the holder identifier is set to an identifier of the second transferee entity and the validated indicator is set to the false state;

linking the third item tracking data block to the second item tracking data block;

responsive to receiving a verification message from a third party, setting the validated indicator in the third item tracking block to true; and signing data in the third item tracking data block with a cryptographic digital signature of the first transferee entity.

6. The computer storage media of claim 5, wherein:
the identifier of the originator entity comprises a public key address for the originator entity;
the identifier of the first transferee entity comprises a public key address for the first transferee entity;
the identifier of the second transferee entity comprises a public key address for the second transferee entity:
the first cryptographic digital signature of the originator entity is partially based on data within the first item tracking data block;
the second cryptographic digital signature of the originator entity is partially based on data within the second item tracking data block; and
the cryptographic digital signature of the first transferee entity is partially based on data within the third item tracking data block.

7. The computer storage media of claim 5, where the step of responsive to receiving a verification message from a validation party, setting the validated indicator in the third item tracking block to true includes, responsive to receiving the verification message from the validation party, transferring payment for the item to the first transferee.

8. The computer storage media of claim 5, where the validation party comprises one of the originator entity, an entity authorized by the originator entity, and a certified entity.

9. An item provenance tracking system, the system comprising:
a plurality of processors; and
non-transitory computer storage media having computer executable instructions stored thereon which, when executed by the plurality of processors, cause the processors to execute an item provenance tracking method comprising:

generating, by a first processor associated with an originator entity, a first item tracking data block on an item tracking data blockchain, the first item tracking data block storing data identifying an item, a holder identifier for identifying a holder of the item and a validated indicator, where holder identifier is set to an identifier of the originator entity for the item and the validated indicator is set to a true state;

signing data in the first item tracking data block with a first cryptographic digital signature of the originator entity;

generating, by a second processor associated with a first transferee entity, a second item tracking data block on the item tracking data blockchain, the second item tracking data block storing a holder identifier and a validated indicator, where the holder identifier is set to an identifier of the first transferee entity and the validated indicator is set to the true state;

linking the second item tracking data block to the first item tracking data block; and signing data in the second item tracking data block with a second cryptographic digital signature of the originator entity;

generating, by a third processor associated with a second transferee entity, a third item tracking data block on the item tracking data blockchain, the third item tracking data block storing a holder identifier and a validated indicator, where the holder identifier is set to an identifier of the second transferee entity and the validated indicator is set to the false state;

linking the third item tracking data block to the second item tracking data block;

responsive to receiving a verification message from a third party, setting the validated indicator in the third item tracking block to true; and signing data in the third item tracking data block with a cryptographic digital signature of the first transferee entity.

10. The item provenance tracking system of claim 9, wherein:

the identifier of the originator entity comprises a public key address for the originator entity;

the identifier of the first transferee entity comprises a public key address for the first transferee entity;

the identifier of the second transferee entity comprises a public key address for the second transferee entity;

the first cryptographic digital signature of the originator entity is partially based on data within the first item tracking data block;

the second cryptographic digital signature of the originator entity is partially based on data within the second item tracking data block; and the cryptographic digital signature of the first transferee entity is partially based on data within the third item tracking data block.

11. The item provenance tracking system of claim 9, where the step of responsive to receiving a verification message from a validation party, setting the validated indicator in the third item tracking block to true includes, responsive to receiving the verification message from the validation party, transferring payment for the item to the first transferee.

12. The item provenance tracking system of claim 9, where the validation party comprises one of the originator entity, an entity authorized by the originator entity, and a certified entity.

* * * * *